(12) United States Patent
Zhao et al.

(10) Patent No.: US 11,343,488 B2
(45) Date of Patent: May 24, 2022

(54) APPARATUSES AND METHODS FOR ENCODING AND DECODING A VIDEO CODING BLOCK OF A MULTIVIEW VIDEO SIGNAL

(71) Applicant: Huawei Technologies Co., Ltd., Shenzhen (CN)

(72) Inventors: Zhijie Zhao, Munich (DE); Johannes Sauer, Aachen (DE); Mathias Wien, Aachen (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 149 days.

(21) Appl. No.: 16/729,086

(22) Filed: Dec. 27, 2019

(65) Prior Publication Data

US 2020/0137382 A1  Apr. 30, 2020

Related U.S. Application Data

(63) Continuation of application No. PCT/EP2017/066117, filed on Jun. 29, 2017.

(51) Int. Cl.
*H04N 19/105* (2014.01)
*H04N 19/11* (2014.01)
(Continued)

(52) U.S. Cl.
CPC ......... *H04N 19/105* (2014.11); *H04N 13/111* (2018.05); *H04N 13/161* (2018.05);
(Continued)

(58) Field of Classification Search
CPC .. H04N 13/282; H04N 13/161; H04N 13/111; H04N 13/172; H04N 19/176;
(Continued)

(56) References Cited

U.S. PATENT DOCUMENTS

2010/0238160 A1  9/2010  Yea et al.
2011/0123113 A1  5/2011  Berretty et al.
(Continued)

FOREIGN PATENT DOCUMENTS

EP  2230856 A2  9/2010
EP  2775723 A1  9/2014

OTHER PUBLICATIONS

Cao et al., "Encoder-Driven Inpainting Strategy in Multiview Video Compression," IEEE Transactions on Image Processing, vol. 25, No. 1, XP011594013, pp. 134-149, Institute of Electrical and Electronics Engineers, New York, New York (Jan. 2016).
(Continued)

*Primary Examiner* — Francis Geroleo
(74) *Attorney, Agent, or Firm* — Leydig, Voit & Mayer, Ltd.

(57) ABSTRACT

A system for encoding and decoding a video coding block of a multi-view video signal is provided. A decoder is configured to decode a texture-depth video coding block ($t_0$, $d_0$) of a first texture frame and a first depth map associated with a first view for providing a decoded texture-depth video coding block ($t_0$, $d_0$) and the first depth map. A synthesized predicted texture-depth video coding block ($t_{syn}$, $d_{syn}$) of a view synthesis texture frame and a view synthesis depth map associated with a second view is generated. An inpainted synthesized predicted texture-depth video coding block is generated. Based on the impainted predicted texture-depth video block, the decoder reconstructs a texture-depth video coding block ($t_1$, $d_1$) of a second texture frame and a second depth map associated with the second view. An encoder is configured to encode the texture-depth video coding block in a manner that complements the decoding provided by the decoder.

17 Claims, 12 Drawing Sheets

(51) Int. Cl.

| | |
|---|---|
| *H04N 19/176* | (2014.01) |
| *H04N 19/182* | (2014.01) |
| *H04N 19/597* | (2014.01) |
| *H04N 13/161* | (2018.01) |
| *H04N 13/111* | (2018.01) |
| *H04N 13/172* | (2018.01) |
| *H04N 13/282* | (2018.01) |

(52) U.S. Cl.
CPC ......... *H04N 13/172* (2018.05); *H04N 13/282* (2018.05); *H04N 19/11* (2014.11); *H04N 19/176* (2014.11); *H04N 19/182* (2014.11); *H04N 19/597* (2014.11)

(58) Field of Classification Search
CPC .... H04N 19/597; H04N 19/105; H04N 19/11; H04N 19/137; H04N 19/182; H04N 19/19; H04N 19/46; H04N 19/593; H04N 19/86; H04N 19/85
See application file for complete search history.

(56) References Cited

U.S. PATENT DOCUMENTS

| | | | | |
|---|---|---|---|---|
| 2012/0120192 | A1* | 5/2012 | Alregib | H04N 13/139 348/43 |
| 2012/0162193 | A1* | 6/2012 | Bae | G06T 5/005 345/419 |
| 2012/0314766 | A1* | 12/2012 | Chien | H04N 19/11 375/240.12 |
| 2013/0127844 | A1 | 5/2013 | Koeppel et al. | |
| 2013/0287289 | A1* | 10/2013 | Tian | G06T 15/04 382/154 |
| 2014/0168362 | A1* | 6/2014 | Hannuksela | H04N 13/161 348/43 |
| 2015/0341614 | A1* | 11/2015 | Senoh | H04N 13/161 348/43 |
| 2016/0065990 | A1* | 3/2016 | Shimizu | H04N 19/597 375/240.12 |

OTHER PUBLICATIONS

Daribo et al., "Depth-aided image inpainting for Novel View Synthesis," 2010 IEEE International Workshop on Multimedia Signal Processing, XP031830576, pp. 167-170, Institute of Electrical and Electronics Engineers, New York, New York (Oct. 2010).

Oh et al., "Hole Filling Method Using Depth Based In-Painting for View Synthesis in Free Viewpoint Television and 3-D Video," 2009 Picture Coding Symposium, XP031491725, pp. 1-4, Institute of Electrical and Electronics Engineers, New York, New York (May 2009).

Daribo et al., "R-D Optimized Auxiliary Information for Inpainting-Based View Synthesis," 2012 3DTV-Conference: The True Vision—Capture, Transmission and Display of 3D Video (3DTV-CON), XP032275880, pp. 1-4, Institute of Electrical and Electronics Engineers, New York, New York (Oct. 2012).

Po et al.,"A new Multidirectional Extrapolation Hole-Filling Method for Depth-Image-Based Rendering," 2011 18th IEEE International Conference of Image Processing, XP032080200, pp. 2589-2592, Institute of Electrical and Electronics Engineers, New York, New York (Sep. 2011).

Zhang et al., "Spatial Error Recovery Using Multi-Directional Inpainting," IEEE International Conference on Acoustics, Speech and Signal Processing, pp. 1389-1392, Institute of Electrical and Electronics Engineers, New York, New York (2008).

Otsu, "A Threshold Selection Method from Gray-Level Histograms," IEEE Transactions on Systems, Man, and Cybernetics, vol. SMC-9, No. 1, pp. 62-66, Institute of Electrical and Electronics Engineers, New York, New York (Jan. 1979).

* cited by examiner

| index | inpainting direction |
|---|---|
| 00 | inpainting from top |
| 01 | inpainting from bottom |
| 10 | inpainting from left |
| 11 | inpainting from right |

Fig. 3c

| index | inpainted predicted video coding block (VCB)s | inpainting direction |
|---|---|---|
| 00 | inpainted predicted VCB_1 | inpainting from top |
| 01 | inpainted predicted VCB_2 | inpainting from bottom |
| 10 | inpainted predicted VCB_3 | inpainting from left |
| 11 | inpainted predicted VCB_4 | inpainting from right |

Fig. 3d

APPARATUSES AND METHODS FOR ENCODING AND DECODING A VIDEO CODING BLOCK OF A MULTIVIEW VIDEO SIGNAL

CROSS-REFERENCE TO RELATED APPLICATIONS

This application is a continuation of International Application No. PCT/EP2017/066117, filed on Jun. 29, 2017, the disclosure of which is hereby incorporated by reference in its entirety.

TECHNICAL FIELD

Embodiments of the present application relate to the field of video coding. More specifically, embodiments of the present application relate to an encoding apparatus for encoding a video coding block of a multiview video signal and a decoding apparatus for decoding a video coding block of a multiview video signal as well as corresponding methods.

BACKGROUND

In multiview video coding, multiple sequences of texture frames have to be coded, which feature multiple views, i.e. at least two different views of a scene. The known standard 3D-HEVC supports block-based view synthesis prediction (VSP) for coplanar camera arrangements, i.e. views from locations within a single plane. For non-coplanar camera arrangements, the assumption that blocks move by the same disparity between different views no longer holds. In this case each sample, e.g. pixel, can shift differently between the views, and therefore depth maps are also used for view synthesis prediction.

In current approaches based on depth maps, video sequences for several views of a scene contain texture data in the form of texture frames and depth map data in the form of corresponding depth maps. Generally, the camera parameters, such as the calibration matrix and the relation to a world coordinate system, are known for each view and for each frame, in case these parameters vary in time. Using 3D warping the different views can be mapped to one another. The mapping is often imperfect, since occlusions are likely to occur in the warped view as illustrated in FIG. 1a.

To make an example, as illustrated in FIG. 1b, say a view named "View 0" shall be warped to the view "View 1". "View 0" is denoted as the reference or base view and "View 1" is denoted as the target or dependent view. Then, for non-occluded areas the warped view "Warped view 0" offers a good predictor for "View 1", while for occluded areas the warped view "Warped view 0" offers no predictor for "View 1". Therefore, blocks or samples inside the occluded areas cannot be efficiently predicted. Further blocks located at the border between the occluded and non-occluded areas are unlikely to be chosen for prediction, since the occluded area introduces a strong edge in the block. Consequently, blocks have to be split or to be Intra coded, which reduces the coding performance.

SUMMARY

Accordingly, it is an object of the application to provide apparatuses and methods for encoding and decoding a video coding block of a 3D or multiview video signal, which allows for providing good predictors for occluded areas, so that the coding performance of a multiview video signal can be improved.

The foregoing and other objects are achieved by the subject matter of the independent claims. Further implementation forms are apparent from the dependent claims, the description and the figures.

According to a first aspect the application relates to an encoding apparatus for encoding a video coding block of a multiview video signal. The apparatus comprises:

an encoder configured to encode a texture-depth video coding block (e.g. $t_0$, $d_0$) of a first texture frame and a first depth map associated with a first view for providing a decoded texture depth video coding block (e.g. $t_0$, $d_0$) of the first texture frame and the first depth map associated with the first view;

a view synthesis prediction unit configured to generate a synthesized predicted texture-depth video coding block (e.g. $t_{syn}$, $d_{syn}$) of a view synthesis texture frame and a view synthesis depth map associated with a second view based on the decoded texture-depth video coding block (e.g. $t_0$, $d_0$) of the first texture frame and the first depth map associated with the first view, wherein the synthesized predicted texture-depth video coding block comprises at least one occlusion area;

an inpainted candidate generation unit configured to generate a plurality of inpainted synthesized predicted texture-depth video coding blocks associated with the second view based on the synthesized predicted texture-depth video coding block (e.g. $t_{syn}$, $d_{syn}$) of the view synthesis texture frame and the view synthesis depth map, wherein the at least one occlusion area is inpainted along a different inpainting direction in each of the plurality of inpainted synthesized predicted texture-depth video coding blocks; and wherein the encoder is further configured to encode, based on an inpainted synthesized predicted texture-depth video coding block which is selected from the plurality of inpainted synthesized predicted video coding blocks, side information in a bitstream, wherein the side information indicates an inpainting direction used for the selected inpainted synthesized texture-depth predicted video coding block. In other words, the side information indicates an inpainting direction on a per-block basis.

It can be understood that the word "multiview" refers to two or more views.

It can be understood that said (decoded or predicted or inpainted predicted) texture-depth video coding block of a texture frame and a depth map (short for video coding block of a texture frame and a depth map in the following description) refers to a texture video coding block and a depth video coding block which are associated with each other, for example, a (decoded) texture video coding block of the first texture frame (e.g. $t_0$) associated with the first view and depth video coding block of the first depth map (e.g. $d_0$) associated with the first view, or that said synthesized predicted texture-depth video coding block of a view synthesis texture frame and a view synthesis depth map associated with a second view refers to a synthesized predicted texture video coding block of the view synthesis texture frame (e.g. $t_{syn}$) associated with the second view and a synthesized predicted depth video coding block of a view synthesis depth map (e.g. $d_{syn}$) associated with the second view, or that said inpainted predicted texture-depth video coding block associated with the second view refers to an inpainted predicted texture video coding block of a second texture frame (e.g. $t_1$) associated with the second view and an inpainted predicted depth video coding block of a second depth map (e.g. $d_1$) associated with the second view. Further, the texture video coding block may comprise or represent the texture values of one or more samples or pixels, and the depth video coding block may comprise or represent the depth values of the one or more samples or pixels.

Thus, an improved encoding apparatus for encoding a video coding block of a multi-view video signal is provided, in which for each video coding block (VCB), there is an adaptive selection of a plurality of directional inpainted predicted video coding blocks for the prediction of occluded areas. In this way, for occluded areas of each VCB, it allows providing a good predictor for another view, thus the coding performance can be improved.

The video coding blocks can be, for example, macro blocks, coding tree units (CTU), coding blocks, coding units, prediction units and/or prediction blocks. Each video coding block can comprise one or more of pixels or samples. The term "depth map" used herein is to cover any kind of maps or frames providing distance information about a distance, such as distance maps or disparity maps.

In a possible implementation form of the apparatus according to the first aspect as such, the inpainted candidate generation unit is configured to generate the plurality of inpainted predicted video coding blocks, by replication of non-occluded samples at the border of the occlusion area along two or more inpainting directions into the occlusion area of the predicted video coding block.

This represents an efficient way of the generation of multiple inpainted predicted video coding blocks. Thus, it is allowed for adaptive selection of the inpainted predicted video coding blocks for the prediction of the occluded areas.

In another possible implementation form of the apparatus according to the first aspect as such, the inpainted candidate generation unit is configured to separate the predicted video coding block of the view synthesis texture frame (e.g. $t_{syn}$) and the view synthesis depth map (e.g. $d_{syn}$) into one or more foreground components (e.g. $t_{fg}$, $d_{fg}$) and one or more non-foreground components (e.g. $t_{bg}$, $d_{bg}$), or one or more background components (e.g. $t_{bg}$, $d_{bg}$) and one or more non-background components (e.g. $t_{fg}$, $d_{fg}$) and fill, based on an occlusion map (e.g. $m_{holes}$), the occlusion area by copying samples of a non-occluded background component or a non-occluded non-foreground component located at the border of the occlusion area along a different inpainting direction.

This represents a particular efficient way of the generation of multiple inpainted predicted video coding blocks. In particular, the inpainting is done efficiently by filling the occlusion from values obtained by choosing the first non-occluded, non-foreground value in a certain direction. In this way, occlusions which are interrupted by foreground components are then filled as if they were a single occlusion, preserving the foreground object, thus embodiment of the present application can not only fill the occlusions up to the border of the foreground objects, but also can fill occlusions across the foreground objects.

In possible implementation forms of the apparatus according to the first aspect as such, the inpainting direction comprises inpainting from left, right, up, down or arbitrary.

In possible implementation forms of the apparatus according to the first aspect as such, the inpainted predicted video coding block is selected from the plurality of inpainted predicted video coding blocks based on a distortion cost function, in particular, a rate distortion cost function.

This represents an efficient way of adaptive selection of a plurality of directional inpainted predicted video coding blocks for the prediction of occluded areas.

In possible implementation forms of the apparatus according to the first aspect as such, the inpainted candidate generation unit is further configured to perform a blurring operation on at least one inpainted area of each of the plurality of inpainted predicted video coding blocks, wherein the at least one inpainted area is corresponding to the at least one occlusion area.

Thus, it is allowed to smooth or mitigate the effects of stripe artifacts of inpainted predicted video coding blocks, and after the blurring operation the inpainted predicted video coding blocks associated with the second view look more natural. Accordingly, the prediction error can be reduced and the coding efficiency can be improved.

In possible implementation forms of the apparatus according to the first aspect as such, the side information comprises an index indicating an inpainting direction used for the selected inpainted predicted video coding block directly or indirectly.

Thus, for each video coding block associated with the second view, it is allowed for signaling to a decoder such that the decoder can inpaint occlusion areas of the corresponding predicted video coding block associated with the second view from the specified direction.

According to a second aspect the application relates to a decoding apparatus for decoding a video coding block of a multi-view video signal, the video signal comprising side information. The decoding apparatus comprises:

a decoder configured to decode a texture-depth video coding block of a first texture frame (e.g. $t_0$) and a first depth map (e.g. $d_0$) associated with a first view for providing a decoded texture-depth video coding block of the first texture frame (e.g. $t_0$) and the first depth map (e.g. $d_0$) associated with the first view;

a view synthesis prediction unit configured to generate a predicted texture-depth video coding block of a view synthesis texture frame (e.g. $t_{syn}$) and a view synthesis depth map (e.g. $d_{syn}$) associated with a second view based on the decoded texture-depth video coding block of the first texture frame (e.g. $t_0$) and the first depth map (e.g. $d_0$) associated with the first view, wherein the predicted texture-depth video coding block comprises at least one occlusion area; an inpainted candidate generation unit configured to generate an inpainted predicted texture-depth video coding block based on the predicted texture-depth video coding block of the view synthesis texture frame (e.g. $t_{syn}$) and the view synthesis depth map (e.g. $d_{syn}$), wherein the at least one occlusion area is inpainted along an inpainting direction indicated by the side information; and wherein the decoder is further configured to reconstruct a texture-depth video coding block of a second texture frame (e.g. $t_1$) and a second depth map (e.g. $d_1$) associated with the second view on the basis of the inpainted predicted texture-depth video coding block.

It is noted that the decoder may be implemented including one or more processing units, e.g. processors or other processing logics or processing circuitry.

Thus, an improved decoding apparatus for decoding a video coding block of a multi-view video signal is provided, in which for a video coding block associated with the second view, there is a specified directional inpainted predicted video coding block for the prediction of occluded areas based on the side information for indicating an inpainting direction on a per-block basis. In this way, for the occluded areas of the VCB, embodiments of the application allow for providing a good predictor for another view, thus the coding performance is improved.

In a possible implementation form of the apparatus according to the second aspect as such, the inpainted candidate generation unit is configured to generate the inpainted predicted video coding block, by replication of non-occluded samples at the border of the occlusion area along the inpainting direction into the occlusion area of the predicted video coding block.

In another possible implementation form of the apparatus according to the second aspect as such, the inpainted candidate generation unit is configured to separate the predicted video coding block of the view synthesis texture frame (e.g. $t_{syn}$) and the view synthesis depth map (e.g. $d_{syn}$) into one or more foreground components (e.g. $t_{fg}$, $d_{fg}$) and/or one or more background components (e.g. $t_{bg}$, $d_{bg}$); and fill, based on an occlusion map (e.g. $m_{holes}$), the occlusion area by copying samples of a non-occluded non-foreground component or a non-occluded background component positioned at the border of the occlusion area along the inpainting direction.

In possible implementation forms of the apparatus according to the second aspect as such, the inpainting direction indicated by the side information comprises inpainting from left, right, up, down or arbitrary.

In possible implementation forms of the apparatus according to the second aspect as such, the inpainted candidate generation unit is further configured to perform a blurring operation on at least one inpainted area of the inpainted predicted video coding block, wherein the at least one inpainted area is corresponding to the at least one occlusion area.

In possible implementation forms of the apparatus according to the second aspect as such, the side information comprises an index indicating directly or indirectly the inpainting direction used for the inpainted predicted video coding block associated with the second view.

According to a third aspect the application relates to a method for encoding a video coding block of a multiview video signal. The method comprises:

encoding a texture-depth video coding block of a first texture frame (e.g. $t_0$) and a first depth map (e.g. $d_0$) associated with a first view for providing a decoded texture-depth video coding block of the first texture frame (e.g. $t_0$) and the first depth map (e.g. $d_0$) associated with the first view;

generating a predicted texture-depth video coding block of a view synthesis texture frame (e.g. $t_{syn}$) and a view synthesis depth map (e.g. $d_{syn}$) associated with a second view based on the decoded texture-depth video coding block of the first texture frame (e.g. $t_0$) and the first depth map (e.g. $d_0$) associated with the first view, wherein the predicted texture-depth video coding block comprises at least one occlusion area;

generating a plurality of inpainted predicted texture-depth video coding blocks based on the predicted texture-depth video coding block of the view synthesis texture frame ($t_{syn}$) and the view synthesis depth map (e.g. $d_{syn}$), wherein the at least one occlusion area is inpainted along a different inpainting direction in each of the plurality of inpainted predicted texture-depth video coding blocks; and encoding, based on an inpainted predicted texture-depth video coding block which is selected from the plurality of inpainted predicted texture-depth video coding blocks, side information in a bitstream, wherein the side information indicates an inpainting direction used for the selected inpainted predicted texture-depth video coding block.

In a possible implementation form of the method according to the third aspect as such, the plurality of inpainted predicted video coding blocks are generated by replication of non-occluded samples at the border of the occlusion area into the occlusion area along two or more inpainting directions.

In a further possible implementation form of the method according to the third aspect as such or the implementation form thereof, the step of generating a plurality of inpainted predicted video coding blocks, comprises:

separating the predicted video coding block of the view synthesis texture frame (e.g. $t_{syn}$) and the view synthesis depth map (e.g. $d_{syn}$) into one or more foreground components (e.g. $t_{fg}$, $d_{fg}$) and one or more non-foreground components (e.g. $t_{bg}$, $d_{bg}$), or one or more background components (e.g. $t_{bg}$, $d_{bg}$) and one or more non-background components (e.g. $t_{fg}$, $d_{fg}$); and filling, based on an occlusion map (e.g. $m_{holes}$), the occlusion area by copying samples of a non-occluded non-foreground component or a non-occluded background component positioned at the border of the occlusion area along a different inpainting direction.

In a further implementation form, the inpainting direction comprises inpainting from left, right, up, down or arbitrary.

In a further implementation form, the at least one inpainted predicted video coding block is selected from the plurality of inpainted predicted video coding blocks based on a distortion cost function, in particular, a rate distortion cost function.

In a further implementation form, the method further comprises the step of performing a blurring operation on at least one inpainted area of each of the plurality of inpainted predicted video coding blocks, wherein the inpainted area is corresponding to the occlusion area.

In a further implementation form, the side information comprises an index indicating an inpainting direction used for the selected inpainted video coding block directly or indirectly.

The method according to the third aspect of the application can be performed by the apparatus according to the first aspect of the application. Further features and implementation forms of the method according to the third aspect of the application result directly from the functionality of the apparatus according to the first aspect of the application and its different implementation forms.

According to a fourth aspect the application relates to a method for decoding a video coding block of a multiview video signal, the video signal comprising side information. The method comprises:

decoding a texture-depth video coding block of a first texture frame (e.g. $t_0$) and a first depth map (e.g. $d_0$) associated with a first view for providing a decoded texture-depth video coding block of the first texture frame (e.g. $t_0$) and the first depth map (e.g. $d_0$) associated with the first view;

generating a predicted texture-depth video coding block of a view synthesis texture frame (e.g. $t_{syn}$) and a view synthesis depth map (e.g. $d_{syn}$) associated with a second view based on the decoded texture-depth video coding block of the first texture frame (e.g. $t_0$) and the first depth map (e.g. $d_0$) associated with the first view, wherein the predicted texture-depth video coding block comprises at least one occlusion area;

generating an inpainted predicted texture-depth video coding block based on the predicted texture-depth video coding block of the view synthesis texture frame (e.g. $t_{syn}$) and the view synthesis depth map (e.g. $d_{syn}$), wherein the at least one occlusion area is inpainted along an inpainting direction indicated by the side information; and reconstructing a texture-depth video coding block of a second texture frame ($t_1$) and a second depth map (e.g. $d_1$) associated with the second view based on the inpainted predicted texture-depth video coding block.

In a possible implementation form of the method according to the fourth aspect as such, the inpainted predicted texture-depth video coding block is generated by replication of non-occluded samples at the border of the occlusion area into the occlusion area along the inpainting direction.

In a further implementation form of the method according to the fourth aspect as such or the first implementation form thereof, the step of generating the inpainted predicted texture-depth video coding block on the basis of the predicted texture-depth video coding block of the view synthesis texture frame (e.g. $t_{syn}$) and the view synthesis depth map (e.g. $d_{syn}$), comprises:

separating the predicted texture-depth video coding block of the view synthesis texture frame (e.g. $t_{syn}$) and the view synthesis depth map (e.g. $d_{syn}$) into one or more foreground components (e.g. $t_{fg}$, $d_{fg}$) and one or more non-foreground components (e.g. $t_{bg}$, $d_{bg}$), or one or more background components (e.g. $t_{bg}$, $d_{bg}$) and one or more non-background components (e.g. $t_{fg}$, $d_{fg}$); and filling, based on an occlusion map (e.g. $m_{holes}$), the occlusion area by copying samples of a non-occluded non-foreground component or a non-occluded background component positioned at the border of the occlusion area along the inpainting direction.

In a further implementation form, the inpainting direction comprises inpainting from left, right, up, down or arbitrary.

In a further implementation form, the method further comprises the step of performing a blurring operation on at least one inpainted area of the inpainted predicted texture-depth video coding blocks, wherein the at least one inpainted area is corresponding to the at least one occlusion area.

The method according to the fourth aspect of the application can be performed by the apparatus according to the second aspect of the application. Further features and implementation forms of the method according to the fourth aspect of the application result directly from the functionality of the apparatus according to the second aspect of the application and its different implementation forms.

According to a fifth aspect the application relates to a computer program comprising program code for performing the method according to the third aspect or the method according to the fourth aspect when executed on a computer.

BRIEF DESCRIPTION OF THE DRAWINGS

Further embodiments of the application will be described with respect to the following figures, wherein:

FIGS. 3c and 3d show schematic tables illustrating indices indicating corresponding inpainting directions directly or indirectly according to an embodiment;

In the various figures, identical reference signs will be used for identical or at least functionally equivalent features.

DETAILED DESCRIPTION OF THE EMBODIMENTS

In the following description, reference is made to the accompanying drawings, which form part of the disclosure, and in which are shown, by way of illustration, specific aspects in which the present application may be placed. It is understood that other aspects may be utilized and structural or logical changes may be made without departing from the scope of the present application. The following detailed description, therefore, is not to be taken in a limiting sense, as the scope of the present application is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1A:
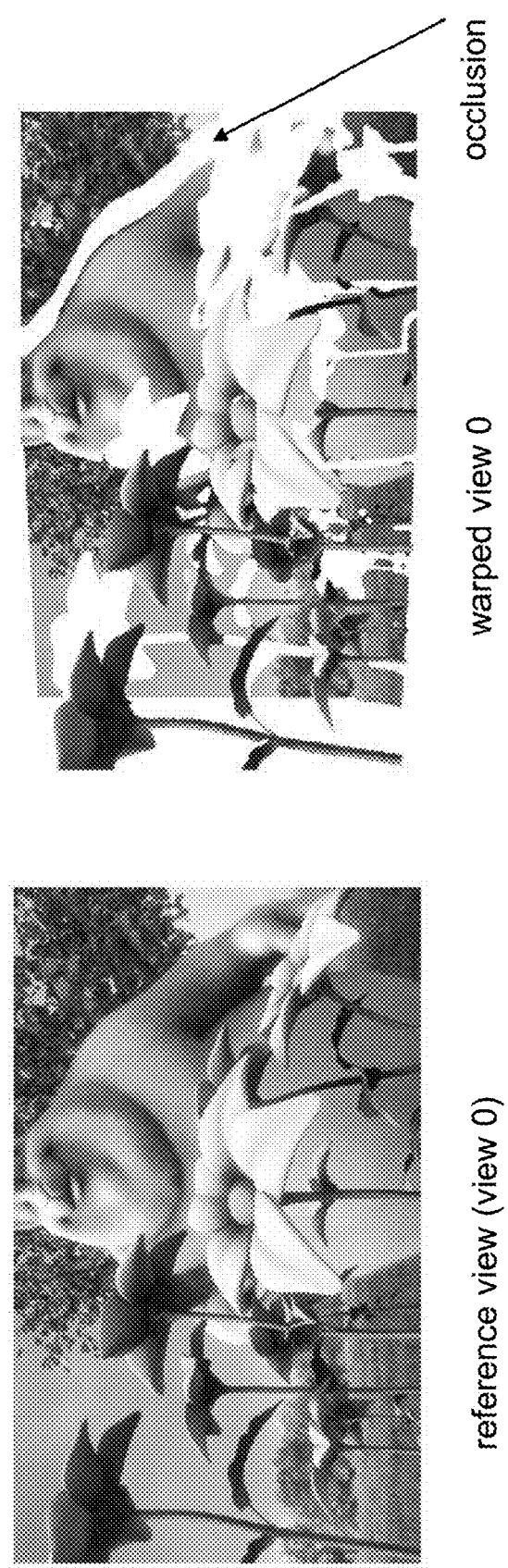
FIGS. 1a and 1b show a schematic diagram illustrating a warping mechanism for warping a picture from view 0 to view 1 and occlusions occurring in the warped view 0.
Figure 1B:
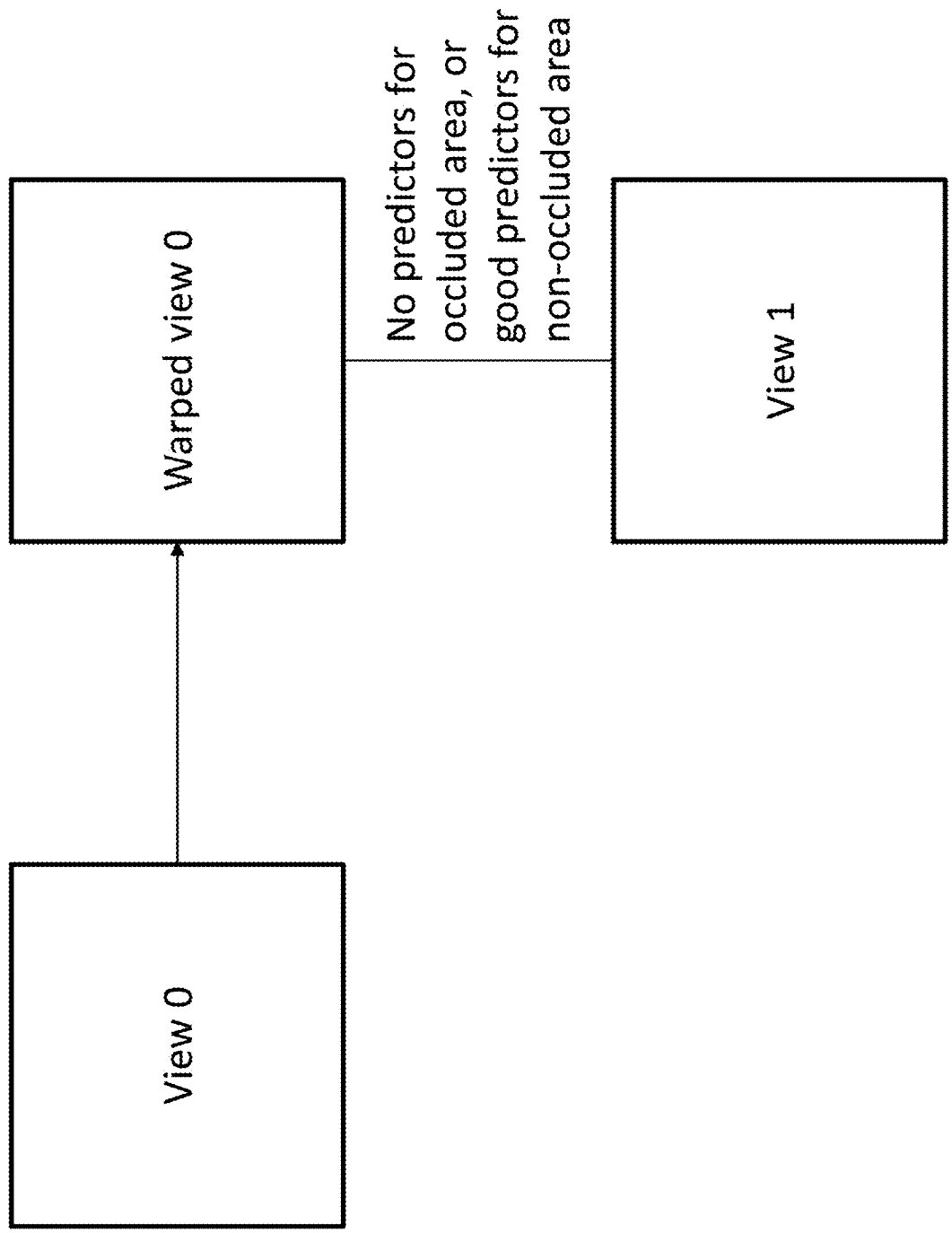
Figure 2A:
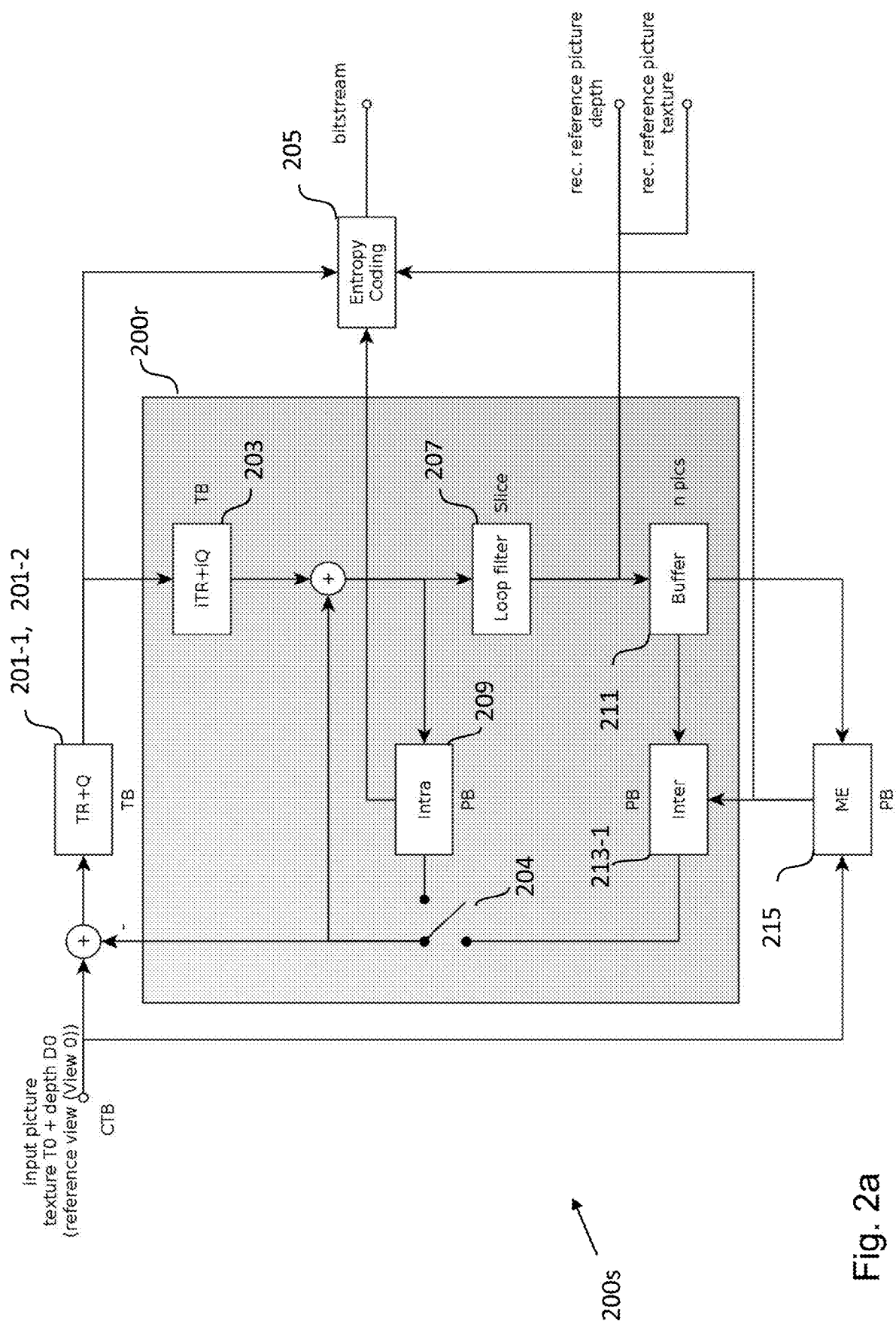
FIGS. 2a and 2b show schematic diagrams illustrating an apparatus 200 for encoding multiview video data according to an embodiment.
Figure 2B:
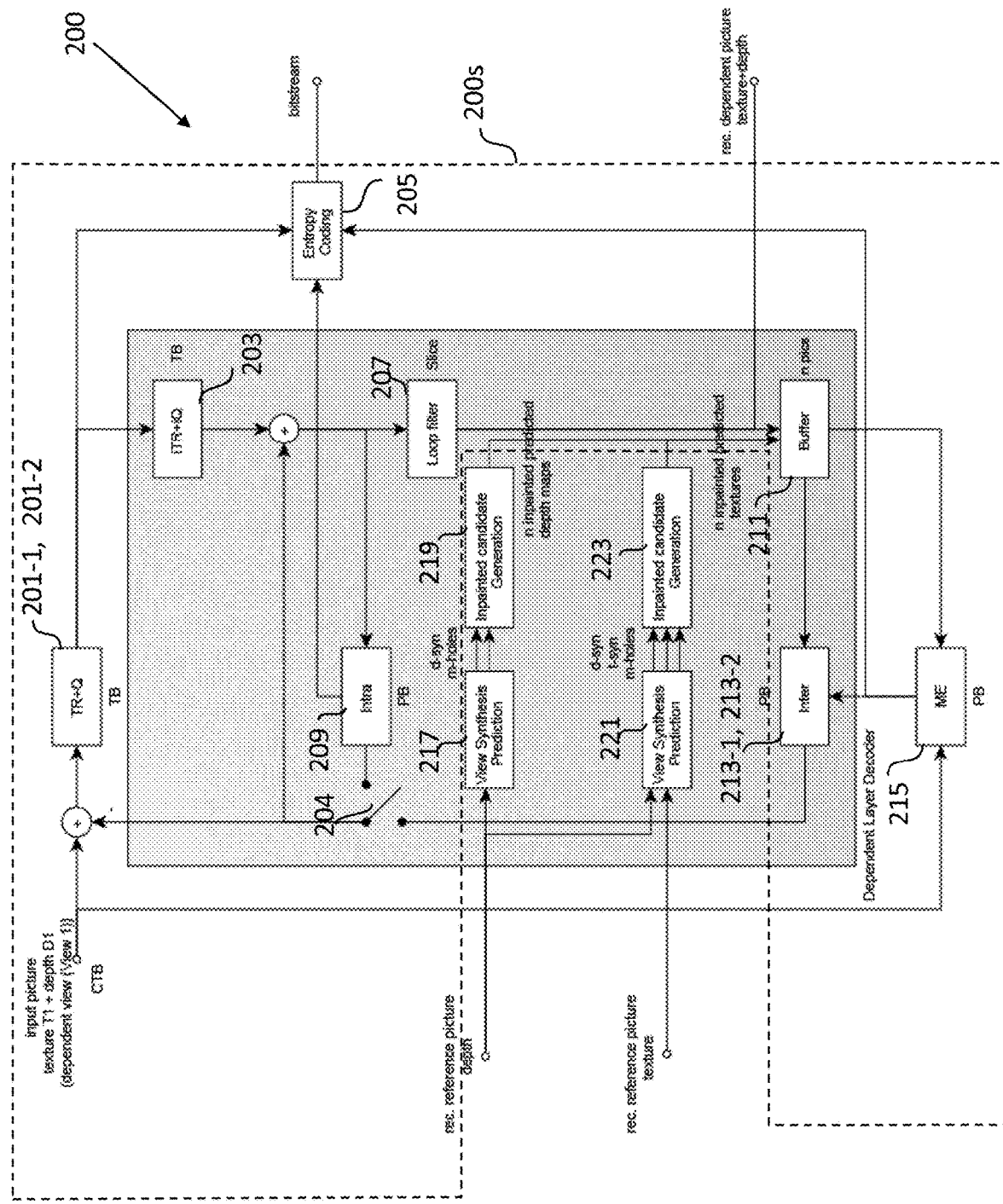

FIGS. 2a and 2b show schematic diagrams illustrating an encoding apparatus 200 for encoding a base or reference view "View 0" (shown in FIG. 2a) and a dependent or target view "View 1" (shown in FIG. 2b) according to an embodiment. The encoding apparatus 200 is configured to encode a multiview video signal, wherein the multiview video signal comprises a plurality of pictures or frames of View 0 and a plurality of pictures or frames of View 1, each picture or frame is dividable into a plurality of video coding blocks and each video coding block comprises a plurality of pixels or samples. Pictures may be referred to as frames, and reference pictures may be referred to reference frames. In particular, both texture and depth map frames of View 0 are split into non-overlapping video coding blocks. Both texture and depth map frames of View 1 are split, for example, into non-overlapping video coding blocks. The video coding blocks can be, for instance, macro blocks, coding tree units (CTUs), coding tree blocks (CTBs), coding units (CUs), coding blocks (CBs), prediction units (PUs) and/or prediction blocks (PBs).

Figure 3A:
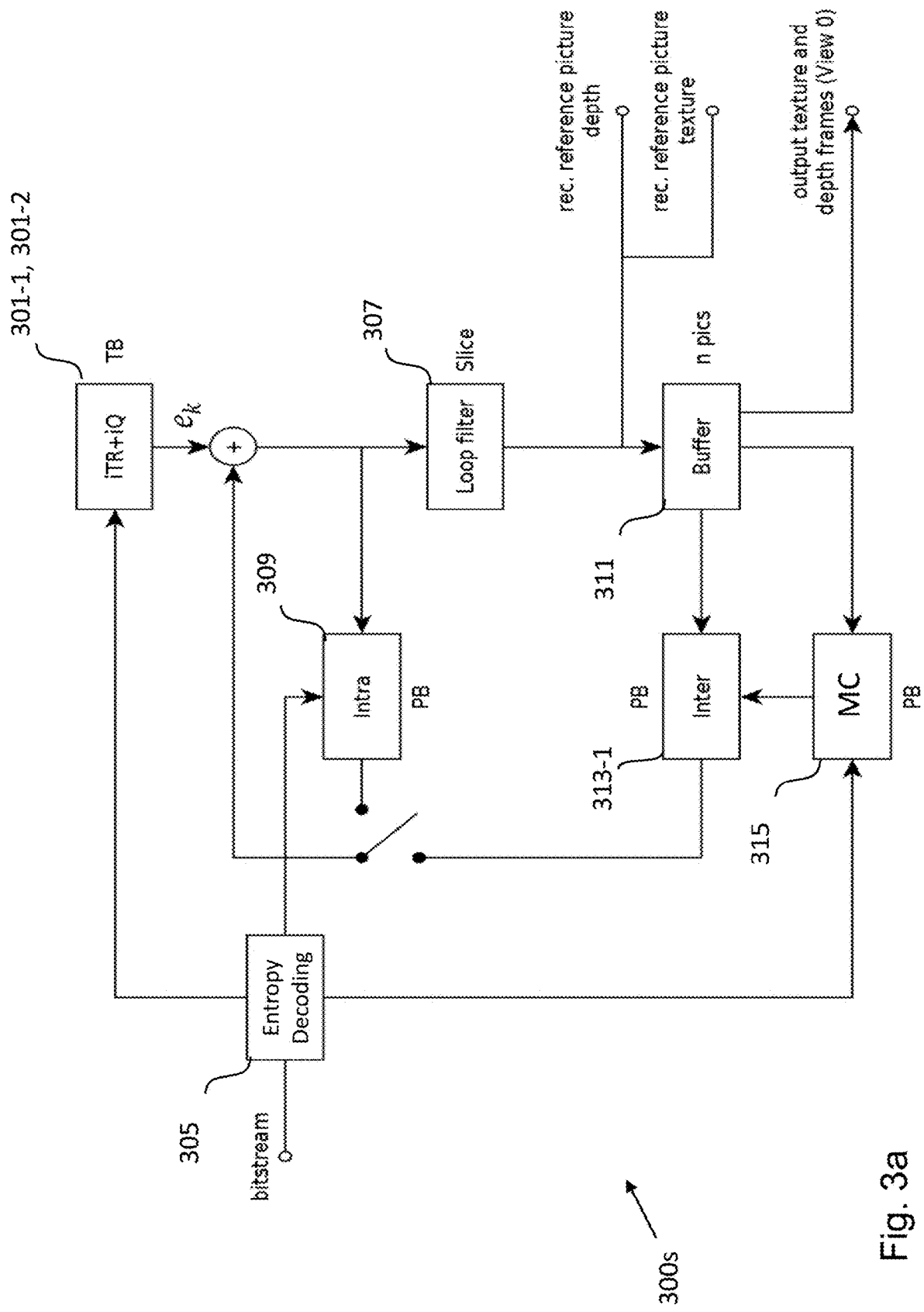
FIGS. 3a and 3b show schematic diagrams illustrating an apparatus 300 for decoding multiview video data according to an embodiment.
Figure 3B:
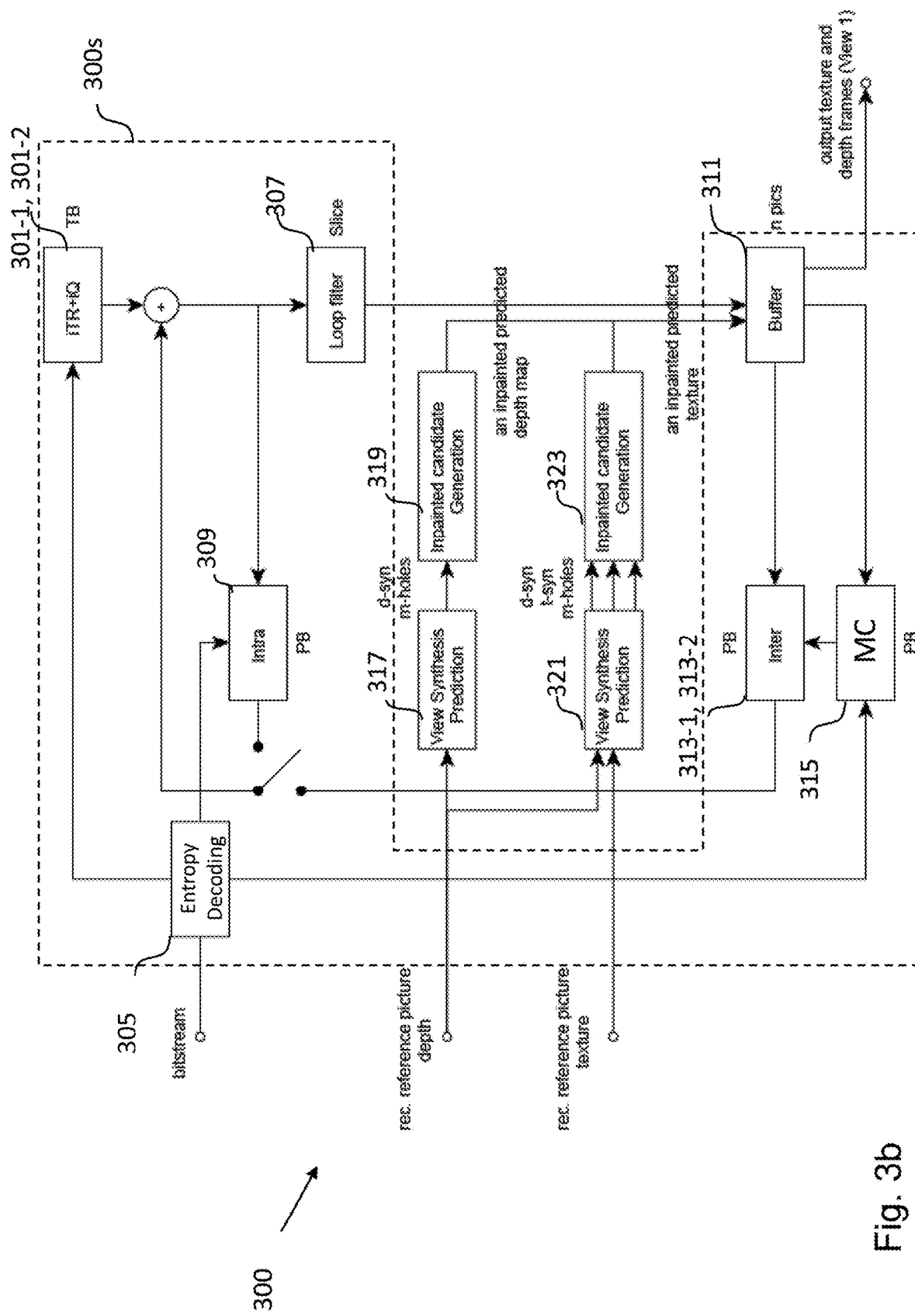

FIGS. 3a and 3b show schematic diagrams illustrating a decoding apparatus 300 for decoding a base or reference view "View 0" (shown in FIG. 3a) and a dependent or target view "View 1" (shown in FIG. 3b) according to an embodiment.

The embodiments of FIGS. 2a, 2b and 3a, 3b show an exemplary setup based on two views, namely a reference or base view or "View 0" or a first view, and a target or dependent view or "View 1" or a second view, wherein each view is associated with a (temporal) sequence of texture frames and corresponding depth maps. Embodiments of the application are not limited to two views but may comprise more than two views, in particular more than one reference view and/or more than one dependent view. The person skilled in the art will readily appreciate how to extend the embodiments shown in FIGS. 2a, 2b and 3a, 3b to more than two views. Very generally both texture frames and depth maps are used for view synthesis prediction of the target or dependent view "View 1" on the basis of the reference view "View 0". Generally, both already coded/decoded texture video coding blocks and depth maps video coding blocks can be used for view synthesis prediction of the current block of target or dependent view "View 1" as well. In other words, an output from the reference view coding is used for coding of the dependent view. Both synthesized texture and depth map may feature occlusions. Embodiments of the application are configured to generate multiple directional inpainted candidate pictures for the treatment of the occlusions during or after the view synthesis prediction. Further, embodiments of the application may be configured to adaptively select the directional inpainted candidate pictures for the prediction of "View 1". As will be described in more detail below.

The encoding apparatus 200 shown in FIGS. 2a, 2b includes an encoder 200s configured to encode a texture video coding block of a first texture frame $t_0$ (in FIGS. 2 and 3 depicted as T0) associated with the reference view View 0 and a depth video coding block of a first depth map $d_0$ (in FIGS. 2 and 3 depicted as D0) associated with the reference view View 0 for providing a decoded/reconstructed texture video coding block of the first texture frame $t_0$ associated with the reference view View 0 and a decoded or reconstructed depth video coding block of the first depth map $d_0$ associated with the reference view. Embodiments of the encoder 200s are not limited to the structure of FIGS. 2a, 2b.

Moreover, the encoding apparatus 200 comprises a first view synthesis prediction unit 221 configured to generate a predicted texture video coding block of a view synthesis texture frame $t_{syn}$ associated with a second view based on a decoded texture video coding block of the first texture frame $t_0$ associated with the first view and a decoded depth video coding block of the first depth map $d_0$ associated with the first view, and a second view synthesis prediction unit 217 configured to generate a predicted depth video coding block of a view synthesis depth map $d_{syn}$ associated with the second view on the basis of decoded depth video coding block of the first depth map $d_0$ associated with the first view. The predicted texture video coding block and/or predicted depth video coding block may comprise at least one occlusion area.

Moreover, the encoding apparatus 200 comprises a first inpainted candidate generation unit 223 is configured to generate a plurality of inpainted predicted texture video coding blocks based on the predicted texture video coding block of the view synthesis texture frame $t_{syn}$ and the predicted depth video coding block of the view synthesis depth map $d_{syn}$, and a second inpainted candidate generation unit 219 configured to generate a plurality of inpainted predicted depth video coding blocks based on the predicted depth video coding block of the view synthesis depth map $d_{syn}$, wherein the at least one occlusion area is inpainted along a different inpainting direction in each of the plurality of inpainted predicted texture video coding blocks and/or inpainted predicted depth video coding blocks. Preferable, the at least one occlusion area is inpainted along a different inpainting direction in each of the plurality of inpainted predicted texture video coding blocks.

In the embodiment shown in FIGS. 2a, 2b, the first view synthesis prediction unit 221 and the second view synthesis prediction unit 217 are provided by separate view synthesis prediction units. In other embodiments, the first view synthesis prediction unit 221 and the second view synthesis prediction unit 217 can be provided by a single view synthesis prediction unit. This holds true for the first inpainted candidate generation unit 223 and the second inpainted candidate generation unit 219.

Moreover, in the encoding apparatus 200, the encoder 200s is further configured to encode, based on an inpainted predicted texture video coding block and/or an inpainted predicted depth video coding block which are selected from the plurality of inpainted predicted texture video coding blocks and/or the plurality of inpainted predicted depth video coding blocks, side information in a bitstream, wherein the side information indicates an inpainting direction used for the selected inpainted predicted texture video coding block and/or selected inpainted predicted depth video coding block. For example, the side information indicates an inpainting direction used for the selected inpainted predicted texture video coding block.

Further components of the encoder 200s as well as the operation of the encoder 200s will be described in the following. Both texture and depth map frames associated with the reference view (View 0) are split into non-overlapping video coding blocks. For each video coding block a predicted video coding block from the reference frame is subtracted to obtain a prediction error. Then the prediction error of the video coding block is transformed, quantized and entropy encoded (see functional blocks 201 and 205 in FIG. 2a). The encoded video coding blocks are made available to a reference layer decoder 200r. The reference layer decoder 200r performs reverse transformation and reverse quantization. In particular, the encoded video coding blocks are provided to a functional block 203, which performs a reverse transformation and reverse quantization (indicated as "iTR+iQ" in FIG. 2a). The reconstructed video coding block is made available for intra prediction of other video coding blocks in the same frame (see functional block 209 in FIG. 2a). Moreover, the video coding block can be processed by a loop filter 207 and stored in the reference picture buffer 211. Thus, the video coding block is also available for inter prediction of other frames and/or inter-view prediction (see functional block 213-1 of FIG. 2a). The inter prediction can be based on a motion estimation (see functional block 215 of FIG. 2a). In an example, a functional block 204 can select the video coding block and the mode (intra/inter), which is used as predictor for a particular video coding block. This information is also needed by the decoder and hence also entropy coded by the entropy encoder 205a. The reconstructed texture and depth map frames are made available to the apparatus 200 for encoding the dependent view (View 1), which is shown in FIG. 2b and will be described in the following. It can be understood that the apparatus 200 may be not only responsible or configured for encoding of the reference view (View 0) but also responsible or configured for encoding of the dependent view (View 1).

When encoding the dependent view (View 1) or the reference view (View 0), several of the functional blocks of the encoding apparatus 200 work identical, only the differences will be explained in more detail. When encoding of the dependent view (View 1), in addition to the texture and depth map frames of View 1, the encoding apparatus 200 shown in FIG. 2b also has the reconstructed texture and depth map frames of the reference view (namely, a first view or View 0) as input. The reconstructed depth map of the reference view is processed by a second view synthesis prediction unit 217 in order to create a predictor for the depth map of the dependent view (View 1). Such predictor is also indicated as a predicted depth video coding block of a view synthesis depth map $d_{syn}$ associated with the dependent view (short for view synthesis predicted depth map $d_{syn}$). Both the reconstructed texture and depth map frames of the reference view are processed by a first view synthesis prediction unit 221 in order to create a predictor for the texture frame of the dependent view (View 1). Such predictor is also indicated as a predicted texture video coding block of a view synthesis texture frame $t_{syn}$ associated with the dependent view (short for view synthesis predicted texture frame $t_{syn}$). These predictors are added to the reference picture buffer 211 or a reference picture list. Both of these predictors (i.e. the predicted texture video coding block and predicted depth video coding block) may have at least one occlusion. In order to fill the at least one occlusion area of the predicted depth video coding block, several candidate pictures (e.g. directional inpainted predicted depth video coding blocks) are generated by a second inpainted candidate generation unit 219 based on an input, i.e. the predicted depth video coding block of the view synthesis depth map $d_{syn}$ and an occlusion map $m_{holes}$, where the at least one occlusion area has been inpainted along a different inpainting direction in each of the inpainted predicted depth video coding blocks (details described below). In order to fill the at least one occlusion area of the predicted texture video coding block, several candidate pictures (e.g. directional inpainted predicted texture video coding blocks) are generated by a first inpainted candidate generation unit 223 based on an input, i.e. the predicted texture video coding block of the view synthesis texture frame $t_{syn}$, the predicted depth video coding block of the view synthesis depth map $d_{syn}$ and an occlusion map $m_{holes}$, where the at least one occlusion area has been inpainted along a different inpainting direction in each of inpainted predicted texture video coding blocks (details described below). These candidate pictures are used as predictors for the depth map and texture of the dependent view. They are, for example, added to the reference picture list and stored in the reference picture buffer 211. It is noted that functional block 213 of FIG. 2*b* includes an inter prediction unit 213-1 and an inter-view prediction unit 213-2.

The reference picture buffer 211 may include the inpainted view synthesis predicted texture frames or blocks and inpainted view synthesis predicted depth map frames or blocks, a reconstructed texture frame or block and a reconstructed depth map frame or block of the previous and/or future frames of the dependent view, and/or a reconstructed texture frame or block and a reconstructed depth map frame or block of the reference view.

Furthermore, the encoding apparatus 200 comprises a prediction selection unit 213-2, which in the embodiment shown in FIG. 2*b* is implemented in the form of an inter-view prediction unit 213-2. The prediction selection unit 213-2 is configured to select the most suitable candidate from the candidates in the reference picture list, in particular, the prediction selection unit 213-2 is configured to select an inpainted predicted texture video coding block from the inpainted predicted texture video coding blocks and an inpainted predicted depth video coding block from the inpainted predicted depth video coding blocks, based on a distortion cost function, such as a Lagrangian rate distortion cost function, where the candidate with the minimum rate distortion cost is the most suitable candidate. It is noted that "video coding block" is also referred to as "block" in the following description.

The inter prediction unit 213-1 may receive as input at least the reconstructed texture block for the dependent view corresponding to a previous or future frame, and the reconstructed depth block for the dependent view corresponding to a previous or future frame. Based on the input, the inter prediction unit 213-1 generates a prediction texture-depth block for the current texture-depth block associated with the dependent view (View 1).

The prediction texture-depth block can then be subtracted from the input texture-depth block to obtain pixel or sample differences between the input texture-depth block to be coded and its prediction texture-depth block, i.e. a residual block. The residual block is then transformed by the transform unit 201-1. The transform coefficients are quantized and entropy coded by the quantization unit 201-2 and the entropy encoding unit 205 so as to generate as an output the encoded video bitstream.

In addition, side information can be encoded and transmitted to the decoding apparatus 300, where the side information may indicate an inpainting direction used for the selected inpainted predicted texture-depth block. In one example, as shown in FIG. 3*c*, the side information includes an index directly indicating an inpainting direction used for the selected inpainted predicted texture-depth block. In another example, as shown in FIG. 3*d*, the side information includes an index directly indicating the selected inpainted predicted texture-depth block, while there is further a mapping between multiple inpainted predicted texture-depth blocks and multiple inpainting directions available for the encoding apparatus 200 or the decoding apparatus 300, thus the index can indicate indirectly an inpainting direction used for the selected inpainted predicted video coding block. For example, the index may be in the form of the reference frame index, thus no syntax change is required and better compatibility can be achieved. As an example, the side-information may be input from the inter-view prediction unit 213-2 to the entropy coding unit 205. The side-information may be then transmitted to a decoding apparatus 300 along with, e.g. multiplexed into, the encoded video signal. Alternatively, the side information may be coded in the video signal to be transmitted as, for example, separate bitstream to the decoding apparatus 300.

FIGS. 3*a* and 3*b* show a schematic diagram illustrating the decoding apparatus 300 for decoding of the reference view (View 0 or a first view) and dependent view (View 1 or a second view) according to an embodiment. The decoding apparatus is configured to process a multiview video signal, in particular, a multiview video signal encoded by the encoding apparatus 200 shown in FIGS. 2*a* and 2*b* and transmitted as a bitstream. The bitstream may include texture frame and depth map frame as well as side information, and the side information may indicate an inpainting direction used by the encoding apparatus 200.

When decoding of the reference view (View 0), the decoding apparatus 300 shown in FIGS. 3*a*, 3*b* comprises a decoder 300*s* configured to decode a texture video coding block of a first texture frame $t_0$ associated with the reference view "View 0" and a depth video coding block of a first depth map $d_0$ associated with the reference view (View 0) for providing a decoded texture video coding block of the first texture frame $t_0$ associated with the reference view ("rec. reference picture texture" in FIG. 3*a*) and a decoded depth video coding block of the first depth map $d_0$ associated with the reference view ("rec. reference picture depth" in FIG.

3a). Embodiments of the decoder 300s are not limited to the structure of FIGS. 3a, 3b and will be explained in more detail.

Moreover, the decoding apparatus 300 shown in FIGS. 3a, 3b comprises a first view synthesis prediction unit 321 configured to generate a predicted texture video coding block of a view synthesis texture frame $t_{syn}$ associated with a second view based on the decoded texture video coding block of the first texture frame $t_0$ associated with the first view and the decoded depth video coding block of the first depth map $d_0$ associated with the first view, where the predicted texture video coding block may have at least one occlusion area, and a second view synthesis prediction unit 317 configured to generate a predicted depth video coding block of a view synthesis depth map $d_{syn}$ associated with the second view based on the decoded depth video coding block of the first depth map $d_0$ associated with the first view, where the predicted depth video coding block may have at least one occlusion area.

Moreover, the decoding apparatus 300 shown in FIGS. 3a, 3b comprises a first inpainted candidate generation unit 323 configured to generate an inpainted predicted texture video coding block based on the predicted texture video coding block of the view synthesis texture frame $t_{syn}$ and the predicted depth video coding block of the view synthesis depth map $d_{syn}$, and a second inpainted candidate generation unit 319 configured to generate an inpainted predicted depth video coding block based on the predicted depth video coding block of the view synthesis depth map $d_{syn}$, wherein the at least one occlusion area has been inpainted along an inpainting direction indicated by the decoded side information in the inpainted predicted texture video coding block and/or inpainted predicted depth video coding block. For example, the at least one occlusion area is inpainted along the indicated inpainting direction in the inpainted predicted texture video coding block.

In the embodiment shown in FIGS. 3a, 3b the first view synthesis prediction unit 321 and the second view synthesis prediction unit 317 are provided by separate view synthesis prediction units. In other embodiments, the first view synthesis prediction unit 321 and the second view synthesis prediction unit 317 can be provided by a single view synthesis prediction unit. This holds true for the first inpainted candidate generation unit 323 and the second inpainted candidate generation unit 319.

Moreover, in the decoding apparatus 300 shown in FIGS. 3a, 3b, the decoder 300s is further configured to reconstruct a texture video coding block of a second texture frame $t_1$ associated with the dependent view (namely, a second view or View 1) on the basis of the inpainted predicted texture video coding block, and reconstruct a depth video coding block of a second depth map $d_1$ associated with the second view on the basis of the inpainted predicted depth video coding block.

Further components of the decoding apparatus 300 (or the decoder 300s) as well as the operation of the decoding apparatus 300 (or the decoder 300s) will be described in the following. The decoding apparatus includes an entropy decoding unit 305 configured to receive as input an encoded bitstream. The input bitstream may include a texture frame and depth map frame as well as side information such as at least one of partition mode, motion information, intra/inter mode and the like, and the side information includes an index indicating an inpainting direction for a predicted texture-depth video coding block associated with the dependent view. In particular, the index indicates the inpainting direction used for the most suitable candidate associated with the dependent view when encoding of the dependent view by the encoding apparatus 200. For example, the index may be in the form of a reference frame index. Both texture frames and depth map frames of the reference view are split into non-overlapping video coding blocks. The residual of a video coding block for both the texture frames and depth maps of the reference view is read from the entropy decoding unit 305 together with the corresponding parameters for inter and intra prediction. The residual is added to a predictor obtained by inter or intra prediction. Then reverse transform and reverse quantization of the texture-depth video coding block are computed in order to reconstruct the texture-depth video coding block associated with the reference view (see functional block 301-1 of FIG. 3a). The reconstructed texture-depth video coding block associated with the reference view is made available for intra prediction of other blocks in the same frame (see functional block 309 of FIG. 3a). Further the reconstructed texture-depth video coding block associated with the reference view can be processed by a loop filter 307 and stored in the reference picture buffer 311. The texture-depth video coding block associated with the reference view is then also available for inter prediction of other frames or interview prediction (see functional block 313-1, 313-2 of FIG. 3a). The inter prediction can be based on a motion compensated prediction (see functional block 315 of FIG. 3a). Both texture frames and depth map frames of the reference view can be outputted in output order from the buffer 311. The reconstructed texture and depth map frames or blocks associated with the reference view are made available to the apparatus 300 for processing the dependent view (View 1), which is shown in FIG. 3b and will be described in the following. It can be understood that the apparatus 300 may be not only responsible or configured for decoding of the reference view (View 0) but also responsible or configured for decoding of the dependent view (View 1).

When decoding of the dependent view (View 1) or the reference view (View 0), several of the functional blocks of the decoding apparatus 300 work identical, only the differences will be explained in more detail. When decoding of the dependent view (View 1), in addition to the texture and depth map frames of View 1, the decoding apparatus 300 shown in FIG. 3b also has the reconstructed or decoded texture frames and depth map frames of the reference view (namely, a first view or View 0) as input available. The reconstructed or decoded depth map of the reference view is processed by a second view synthesis prediction unit 317 in order to create a predictor for the depth map of the dependent view. Such predictor is also indicated as a predicted depth video coding block of a view synthesis depth map $d_{syn}$ associated with the dependent view (short for view synthesis predicted depth map $d_{syn}$). Both the reconstructed texture and depth map frames of the reference view are processed by a first view synthesis prediction unit 321 in order to create a predictor for the texture frame of the dependent view. Such predictor is also indicated as a predicted texture video coding block of a view synthesis texture frame $t_{syn}$ associated with the dependent view (short for view synthesis predicted texture frame $t_{syn}$). These predictors are added to the reference picture buffer 311 or a reference picture list.

Both of these predictors (the predicted texture video coding block and predicted depth video coding block associated with the dependent view) may have at least one occlusion. In order to fill the at least one occlusion area of the predicted depth video coding block, an inpainted predicted depth video coding block is generated by a second inpainted candidate generation unit 319 based on a first input (e.g. the predicted depth video coding block of the view synthesis depth map $d_{syn}$ and an occlusion map $m_{holes}$) and a second input (e.g. the side information read from the reference picture buffer 311). It is noted that the side information is decoded by the entropy decoding unit 305 and then stored in the reference picture buffer 311 (or some other buffer memory of the decoder). In particular, the at least one occlusion area of the predicted depth video coding block has been inpainted along an inpainting direction indicated by the side information, in particular, the reference frame index. Similarly, in order to fill the at least one occlusion area of the predicted texture video coding block, an inpainted predicted texture video coding block is generated by a first inpainted candidate generation unit 323 based on a first input (e.g. the predicted texture video coding block of the view synthesis texture frame $t_{syn}$, the predicted depth video coding block of the view synthesis depth map $d_{syn}$ and an occlusion map $m_{holes}$) and a second input (e.g. the side information read from the reference picture buffer 311). In particular, the at least one occlusion area of the predicted texture video coding block has been inpainted along an inpainting direction indicated by the side information, in particular, the reference frame index. As an example, the side information, in particular, the reference frame index may be input from the entropy decoding unit 305 to the reference picture buffer 311.

As already described with reference to the encoding apparatus 200, the reference picture buffer 311 may include the inpainted view synthesis predicted texture frame or block and the inpainted view synthesis predicted depth map frame or block as well as a corresponding reconstructed texture frame or block and a corresponding reconstructed depth map frame or block from a previous and/or future frame for the dependent view. The description of the function of the buffer 311 and of the inter prediction unit 313-1 is similar as described with reference to the encoder and will not described again.

As can be seen from above, in the context of FIGS. 2a, 2b and 3a, 3b and as an example, an inpainted predicted VCB_1 in which the occlusion has been inpainted from top in "Warped view 0" can be chosen by the encoding apparatus 200 or the decoding apparatus 300 for the prediction of a corresponding VCB_1 in "View 1", an inpainted predicted VCB_2 in which the occlusion has been inpainted from bottom in "Warped view 0" can be chosen by the encoding apparatus 200 or the decoding apparatus 300 for the prediction of a corresponding VCB_2 in "View 1", an inpainted predicted VCB_3 in which the occlusion has been inpainted from left in "Warped view 0" can be chosen by the encoding apparatus 200 or the decoding apparatus 300 for the prediction of a corresponding VCB_3 in "View 1" and an inpainted predicted VCB_4 in which the occlusion has been inpainted from right in "Warped view 0" can be chosen by the encoding apparatus 200 or the decoding apparatus 300 for the prediction of a corresponding VCB_4 in "View 1". Thus compared with a conventional solution in which all video coding blocks in which the occlusions have been inpainted from a unified or same direction, embodiments of the application allow to use different inpainting directions for different video coding blocks of the same picture or frame. Thus, the whole picture in "Warped view 0" after block-based directional inpainting and block-based adaptive selection may be more similar to the actual picture in View 1 and offer a good predictor for the content in the View 1. Thus, the coding performance of the dependent view may be improved. Accordingly, to the embodiments of the present application, inpainted predicted video coding blocks in "Warped view 0" can be chosen by the encoding apparatus 200 or the decoding apparatus 300 for the prediction of "View 1", thus for both non-occluded parts and occluded parts the warped view "Warped view 0" may provide a better predictor for the dependent view "View 1", thereby improving the coding performance of the multiview video data.

Figure 4:
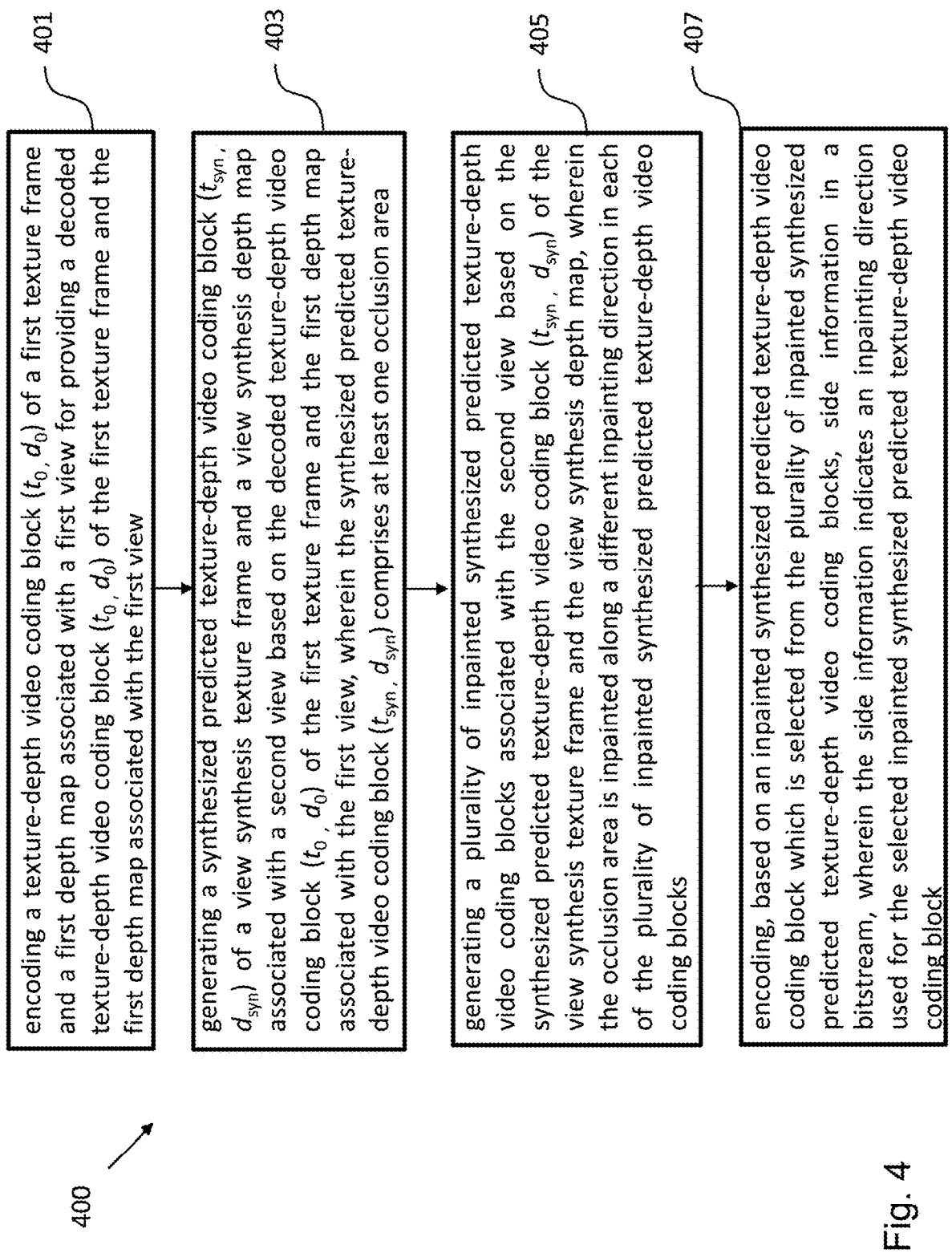
FIG. 4 shows a schematic diagram illustrating a method for encoding multiview video data according to an embodiment.

FIG. 4 shows a schematic diagram illustrating a method 400 for encoding a video coding block of multiview video data according to an embodiment, wherein the multiview video data comprises a plurality of pictures or frames of View 0 and a plurality of pictures or frames of View 1, and View 1 is encoded dependent from View 0. Generally, each picture or frame is dividable into a plurality of video coding blocks and each video coding block comprises a plurality of pixels or samples. In particular, both texture and depth map frames of View 0 are split into non-overlapping video coding blocks. Both texture and depth map frames of View 1 are split into non-overlapping video coding blocks. The video coding blocks could be, for instance, macro blocks, coding tree units (CTUs), coding tree blocks (CTBs), coding units (CUs), coding blocks (CBs), prediction units (PUs) and/or prediction blocks (PBs). For example, a digital video encoder, such as the encoding apparatus 200 described above, may use the process 400 to perform view synthesis prediction and directional inpainting in multi-view coding. In some embodiments, the process 400 may be performed by some other component or apparatus.

The encoding method 400 comprises a step 401 of encoding a video coding block of a first texture frame $t_0$ and a first depth map $d_0$ associated with a first view for providing a decoded video coding block of the first texture frame $t_0$ and the first depth map $d_0$ associated with the first view, a step 403 of generating a predicted video coding block of a view synthesis texture frame $t_{syn}$ and a view synthesis depth map $d_{syn}$ associated with a second view based on the decoded video coding block of the first texture frame $t_0$ and the first depth map $d_0$ associated with the first view, wherein the predicted video coding block comprises at least one occlusion area, a step 405 of generating a plurality of inpainted predicted video coding blocks associated with the second view based on the predicted video coding block of the view synthesis texture frame $t_{syn}$ and the view synthesis depth map $d_{syn}$, wherein the at least one occlusion area is inpainted along a different inpainting direction in each of the plurality of inpainted predicted video coding blocks and a step 407 of encoding, based on an inpainted predicted video coding block which is selected from the plurality of inpainted predicted video coding blocks, side information in a bitstream, wherein the side information indicates an inpainting direction used for the selected inpainted predicted video coding block.

Figure 5:
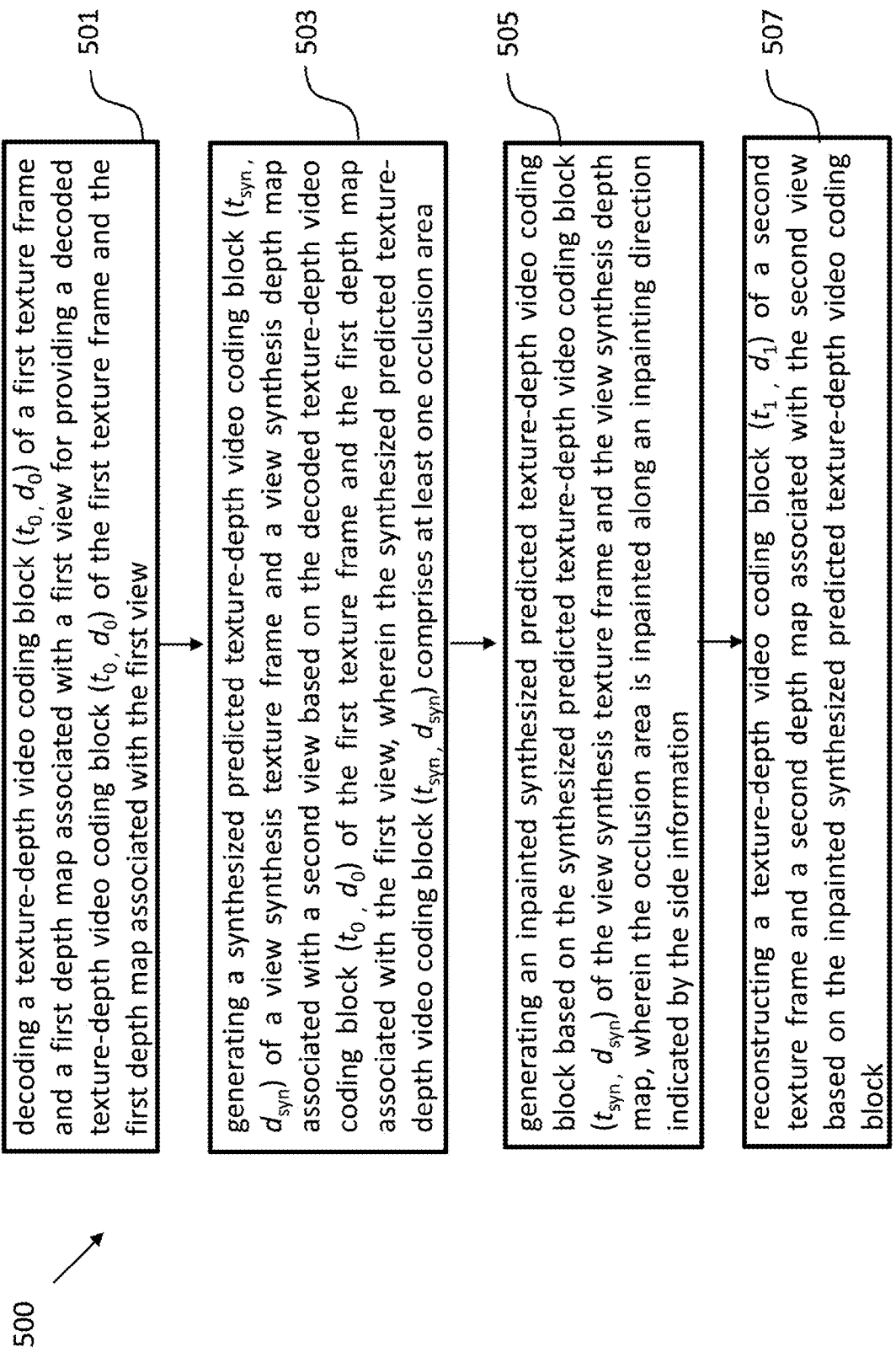
FIG. 5 shows a schematic diagram illustrating a method for decoding multiview video data according to an embodiment.

FIG. 5 shows a schematic diagram illustrating a method 500 for decoding a video coding block of a multi-view video signal according to an embodiment. The multiview video signal is transmitted as a bitstream. The bitstream may include texture frame and depth map frame as well as side information, and the side information may indicate a block-based inpainting direction. In particular, both texture and depth map frames of View 1 or View 0 are split into non-overlapping video coding blocks. View 1 is decoded dependent from View 0. The video coding blocks could be, for instance, macro blocks, coding tree units (CTUs), coding tree blocks (CTBs), coding units (CUs), coding blocks (CBs), prediction units (PUs) and/or prediction blocks (PBs). For example, a digital video decoder, such as the decoding apparatus 300 described above, may use the method 500 to perform view synthesis prediction and directional inpainting in multi-view decoding. In some embodiments, the method 500 may be performed by some other component or apparatus.

The decoding method 500 comprises a step 501 of decoding a video coding block of a first texture frame $t_0$ and a first depth map $d_0$ associated with a first view for providing a decoded video coding block of the first texture frame $t_0$ and the first depth map $d_0$ associated with the first view, a step 503 of generating a predicted video coding block of a view synthesis texture frame $t_{syn}$ and a view synthesis depth map $d_{syn}$ associated with a second view based on the decoded video coding block of the first texture frame $t_0$ and the first depth map $d_0$ associated with the first view, wherein the predicted video coding block comprises at least one occlusion area, a step 505 of generating an inpainted predicted video coding block associated with the second view based on the predicted video coding block of the view synthesis texture frame $t_{syn}$ and the view synthesis depth map $d_{syn}$, wherein the at least one occlusion area is inpainted along an inpainting direction indicated by the side information, and a step 507 of reconstructing a video coding block of a second texture frame $t_1$ and a second depth map $d_1$ associated with the second view based on the inpainted predicted video coding block.

In the following, further embodiments of the application will be described in more detail. It is to be understood that, unless explicitly stated to the contrary, the further embodiments can be implemented in any one of the encoding apparatus 200, the decoding apparatus 300, the encoding method 400 and the decoding method 500.

In an embodiment, the inpainted candidate generation unit 223, 219 of the encoding apparatus 200 is configured to perform a multiple-step process. Similarly, in an embodiment, the process 405 of the encoding method 400 may include a multiple-step process as follows:

In a first step, the inpainted candidate generation unit 223, 219 is configured to perform a pre-processing step on a map of the occlusions $m_{holes}$, in order to change its size or shape of the occlusions. In an example, the occlusion map $m_{holes}$ may be widened by a few pixels or samples (dilate operation, for example, 2 pixels or samples in an exemplary implementation) in case that the borders of the occlusions were not detected perfectly. It can be understood that this step is optional.

Specifically, the input to the inpainted candidate generation unit 223, 219 includes a synthesized texture and depth map frame, $t_{syn}$ and $d_{syn}$ and the map of the occlusions $m_{holes}$. The occlusion map $m_{holes}$ has the same size as the texture and depth map. View synthesis prediction (VSP) is initialized with $m_{holes}$ set to all ones. In other words, 1 means occlusion happens for each video coding block in default; and vice versa. If a pixel or sample is projected from the reference view to the synthesized or warped view, the corresponding location in $m_{holes}$ is cleared, i.e. 1→0, where 0 means non-occlusion happens for a corresponding video coding block. Thus at the end of VSP, $m_{holes}$ is a map of the occlusion areas, where the occlusion areas refer to those for which no pixel or sample could be synthesized. Processes of generating the map of the occlusions are well known to a person skilled in the art, and details are not repeatedly described herein.

In a second step, the inpainted candidate generation unit 223, 219 is configured to separate the predicted texture video coding block of the view synthesis texture frame $t_{syn}$ and the predicted depth video coding block of the view synthesis depth map $d_{syn}$ into one or more foreground components $t_{fg}$, $d_{fg}$ and/or one or more background components $t_{bg}$, $d_{bg}$.

It can be understood that at once the foreground components have been separated, the others may be supposed to be background or non-foreground components; alternatively, once the background components have been separated, the others may be supposed to be foreground or non-background components. It can be understood that a non-foreground component is a background component and a non-background component may be a foreground component.

In an exemplary implementation, $t_{syn}$ and $d_{syn}$ are separated into foreground components $t_{fg}$, $d_{fg}$ and background components $t_{bg}$, $d_{bg}$. The foreground or background component may comprise or be formed by one or a plurality of pixels or samples. Depth information is used to determine foreground and background regions respectively foreground and background components. In an example, Otsu thresholding method may be performed for the area in $d_{syn}$ which is not occluded. By this means, $t_{syn}$ and $d_{syn}$ are separated into the foreground components $t_{fg}$, $d_{fg}$ and background components—$t_{bg}$, $d_{bg}$ based on a threshold, where the threshold may be predefined or can be adaptively determined. This is a known technology to a person skilled in the art, and details are not repeatedly described herein.

Figure 6:
FIG. 6 shows a schematic diagram illustrating occlusion areas of the warped picture which have been inpainted along different inpainting directions according to an embodiment.
Figure 6:
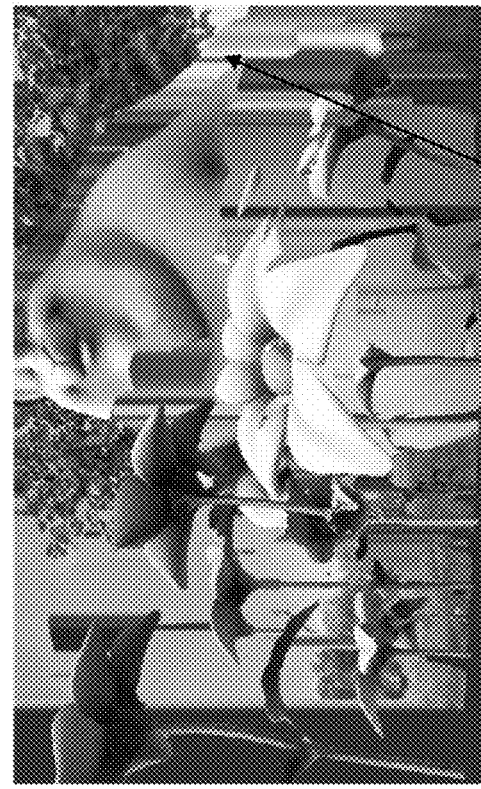

In a third step, the inpainted candidate generation unit 223, 219 is configured to generate the plurality of inpainted predicted video coding blocks, by replication of non-occluded samples at the border of the occlusion area along two or more inpainting directions into the occlusion area of the predicted video coding block, as illustrated in FIG. 6. Specifically the inpainted candidate generation unit 223, 219 is configured to fill, based on the occlusion map $m_{holes}$, the occlusion area by copying samples of a non-occluded non-foreground component or a non-occluded background component positioned at the border of the occlusion area along a different inpainting direction.

In an exemplary implementation, four candidate pictures are generated for both the texture frame and depth map, one for each of the directions left, right, up and down. It can be understood that for the sake of simplicity, the directions left, right, up and down are used. However, it is clear that any other directions also can be applied, especially when the camera moves not horizontally or vertically between views. For the directions left and right the picture is processed row-wise, and for the directions up and down the picture is processed column-wise. The rows or columns can be processed independently. Let now $v_c$ denote the value of the currently processed pixel or sample of a row or column. $v_l$ denotes the last valid value in the row or column. Then the following cases may be considered, e.g. for sample-by-sample (or pixel-by-pixel) processing of samples of a row or column of a block according to a processing direction (e.g. row-wise from left to right or vice versa, or column-wise from top to bottom or vice versa):

The current pixel or sample is not inside an occlusion ($m_{holes}$ is 0 at the pixel or sample position, and 0 means no occlusion at the pixel or sample position). The value of $v_c$ is not changed. If the current pixel or sample belongs to the background component, $v_l$ is set to the value of $v_c$. In this way, the last valid value is stored so that it can be replicated when an occlusion occurs, to fill the occlusion. If the current pixel or sample belongs to the foreground, $v_l$ is not modified.

The current pixel or sample is in an occlusion ($m_{holes}$ is 1 at the pixel or sample position, and 1 means occlusion at the pixel or sample position). The value of $v_c$ is set to $v_l$.

In a fourth step, the inpainted candidate generation unit 223, 219 is further configured to perform a blurring operation on at least one inpainted area of each of the plurality of inpainted predicted video coding blocks, wherein the at least one inpainted area is corresponding to the at least one occlusion area. In an example, a blurring operation is applied to the inpainted area which is perpendicular to the inpainting direction. Thus the stripe artifacts of the inpainted picture can be mitigated. It can be understood that this step is optional. In an alternative implementation, the prediction selection unit 213-2 (which in the embodiment shown in FIG. 2*b* is implemented in the form of an inter-view prediction unit 213-2) is further configured to perform a blurring operation on at least one inpainted area of the selected inpainted predicted video coding block.

Figure 7:
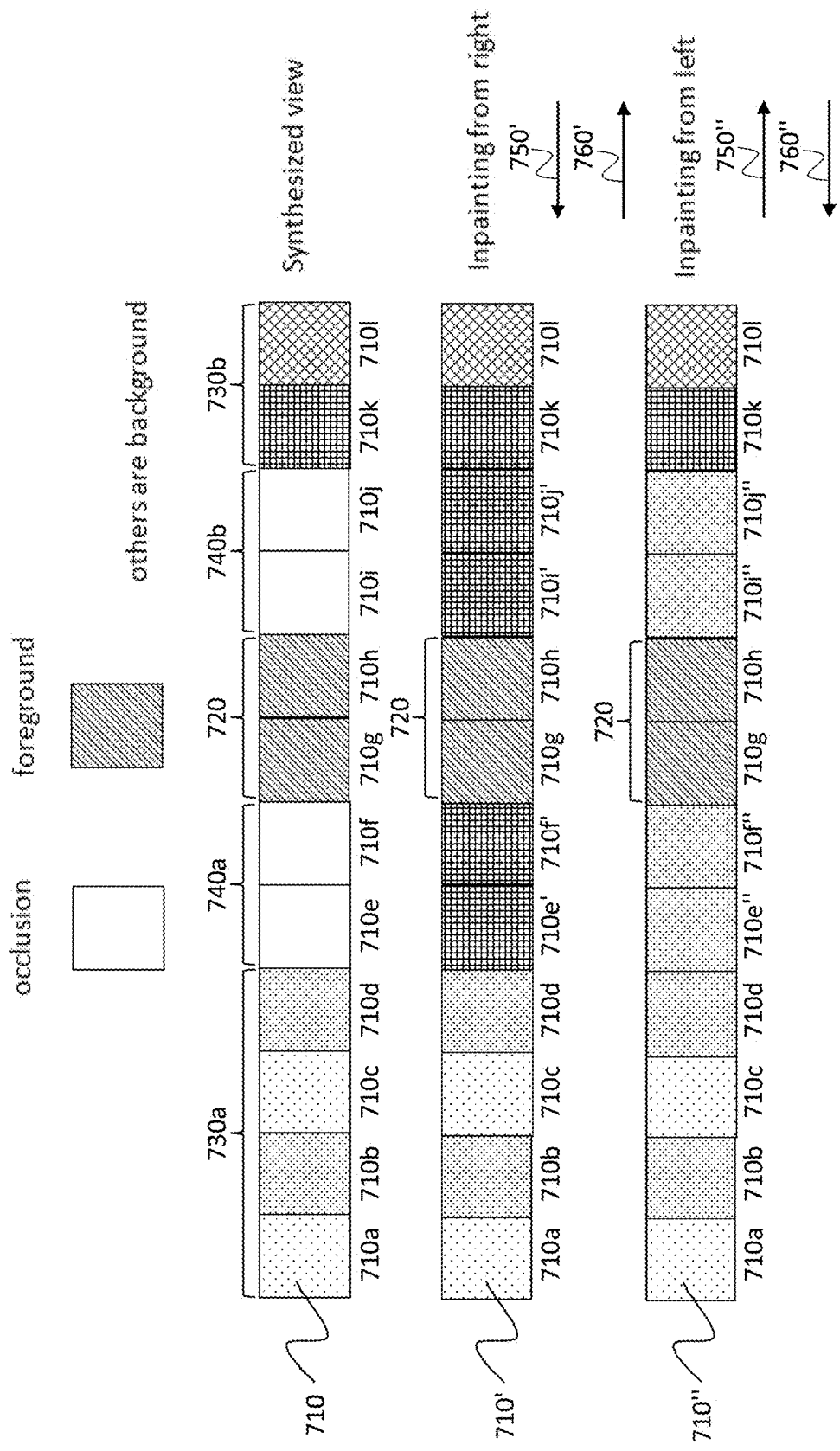
FIG. 7 shows a schematic diagram illustrating occlusion areas of the warped picture which have been inpainted along different inpainting directions according to an embodiment.

FIG. 7 shows an example illustrating the advantageous effect provided by the inpainted candidate generation unit 223, 219 in that FIG. 7 shows that the inpainting is done very efficiently by filling the occlusion (see top line of FIG. 7) from values obtained by choosing the first non-occluded, not-foreground component in a certain direction, for example, in the inpainting or processing direction from right to left (see center line of FIG. 7) or from left to right (see bottom line of FIG. 7).

The top line of FIG. 7 shows an exemplary sample (or pixel) row (or line) 710 of samples (respectively pixels) of a synthesized predicted texture-depth video coding block (respectively of a synthesized predicted texture video coding block or synthesized predicted depth video coding block) comprising a plurality of samples (respectively pixels) 710*a* to 710*l*. The sample (respectively pixel) row 710 comprises a foreground component 720, which comprises or is formed by samples 710*g* and 710*h*, background components 730*a* (comprising or formed by samples 710*a* to 710*d*) and 730*b* (comprising or formed by samples 710*k* and 710), and occlusion areas 740*a* (comprising or formed by samples 710*e* and 710*f*) and 740*b* (comprising or formed by samples 710*i* to 710*j*). The background components 730*a* and 730*b* may also form one background component 730, which is separated by foreground component 720. The occlusion areas 740*a* and 740*b* may also form one occlusion area 740, which is separated by foreground component 720.

The center line of FIG. 7 shows an exemplary sample (or pixel) row (or line) 710' of samples (respectively pixels) of an inpainted synthesized predicted texture-depth video coding block (respectively of an inpainted synthesized predicted texture video coding block or inpainted synthesized predicted depth video coding block) comprising a plurality of samples (respectively pixels) 710*a* to 710*l*, wherein the samples (or the values of the samples) of the occlusion areas 740*a* and 740*b* have been inpainted row-wise from the right (inpainting direction 750') using sample 710*k* (respectively the value of sample 710*k*), which is positioned at the right border of the occlusion area 740*b* respectively 740. The fact that the samples of the occlusions area have been inpainted from the right is indicated by a depicting those as 710*e'*, 710*f*, 710*i'* and 710*j'*. The inpainting direction (from right to left) is depicted as 750' and the opposite direction (from left to right) of the inpainting direction as 760'.

The bottom line of FIG. 7 shows an exemplary sample (or pixel) row (or line) 710" of samples (respectively pixels) of an inpainted synthesized predicted texture-depth video coding block (respectively of an inpainted synthesized predicted texture video coding block or inpainted synthesized predicted depth video coding block) comprising a plurality of samples (respectively pixels) 710*a* to 710*l*, wherein the samples (or the values of the samples) of the occlusion areas 740*a* and 740*b* have been inpainted row-wise from the left (inpainting direction 750") using sample 710*d* (respectively the value of sample 710*d*), which is positioned at the left border of the occlusion area 740*a* respectively 740. The fact that the samples of the occlusions area have been inpainted from the left is indicated by a depicting those as 710*e"*, 710*f"*, 710*i"* and 710*j"*. The inpainting direction (from left to right) is depicted as 750" and the opposite direction (from right to left) of the inpainting direction as 760".

In other words, embodiments of the application are configured (independent of whether an occlusion area, e.g. 740*a* for the inpainting from right as shown for the center line 710', is separated from a non-occluded background component or a non-occluded non-foreground component 730*b* by a foreground component or non-background component 720, or not, e.g. 740*b* for the inpainting from right as shown for the center line 710') to fill, based on an occlusion map $m_{holes}$, the occlusion area (e.g. 740*a* and 740*b*) by copying along the inpainting direction (e.g. 750' for the inpainting from right as shown for the center line 710') a sample (e.g. 710*k* for the inpainting from right as shown for the center line 710'), of a non-occluded background component or a non-occluded non-foreground component (e.g. 730*b* for the inpainting from right as shown for the center line 710'), positioned closest to the occlusion area (e.g. 740*a* and 740*b* for the inpainting from right as shown for the center line 710') in opposite direction (e.g. 760' for the inpainting from left as shown for the center line 710') to the inpainting direction (e.g. 750' for the inpainting from right as shown for the center line 710'). Embodiments of the application may be configured to inpaint occluded areas accordingly, for any inpainting direction.

Thus, embodiments can not only fill the occlusions up to the border of the foreground objects, but also can fill occlusions across the foreground objects, i.e. occlusions which are interrupted by foreground components are then filled as if they were a single occlusion, preserving the foreground object.

Embodiments of the encoder and/or decoder may be implemented as hardware, firmware, software or any combination thereof. For example, the functionality of the encoder/encoding or decoder/decoding may be performed by a processor, a microcontroller, a digital signal processor (DSP), a field programmable gate array (FPGA), an application-specific integrated circuit (ASIC), or the like.

The functionality of the encoder/encoding or decoder/decoding may be implemented by program instructions stored on a computer readable medium. The program instructions, when executed, cause the computer, processor or the like, to perform the steps of the encoding and/or decoding methods. The computer readable medium can be any medium on which the program is stored such as a Blu ray disc, DVD, CD, USB (flash) drive, hard disc, server storage available via a network, etc.

The encoder and/or decoder may be implemented in various devices including a TV set, set top box, PC, tablet, smartphone, or the like. The functionality may be implemented by means of a software, e.g. an app implementing the method steps.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the embodiments of the present application beyond those described herein. While the present application has been described with reference to one or more particular embodiments, those skilled in the art recognize that many changes may be made thereto without departing from the scope of the present application. It is therefore to be understood that within the scope of the appended claims and their equivalents, the application may be practiced otherwise than as specifically described herein.

What is claimed is:

1. A decoding apparatus for decoding a video coding block of a multiview video signal comprising side information, the decoding apparatus comprising:
    a decoder configured to decode a texture-depth video coding block of a first texture frame and a first depth map associated with a first view for providing a decoded texture-depth video coding block of the first texture frame and the first depth map associated with the first view;
    a view synthesis predictor configured to generate a synthesized predicted texture-depth video coding block of a view synthesis texture frame and a view synthesis depth map associated with a second view based on the decoded texture-depth video coding block of the first texture frame and the first depth map associated with the first view,
        wherein the synthesized predicted texture-depth video coding block comprises at least one occlusion area;
    an inpainted candidate generator configured to (i) generate an inpainted synthesized predicted texture-depth video coding block associated with the second view based on the synthesized predicted texture-depth video coding block of the view synthesis texture frame and the view synthesis depth map, (ii) separate the inpainted synthesized predicted texture-depth video coding block into one or more foreground components and/or one or more background components, and (iii) fill, based on an occlusion map, the at least one occlusion area by copying, along an inpainting direction, a sample of a non-occluded background component or a non-occluded non-foreground component positioned closest to the at least one occlusion area in an opposite direction to the inpainting direction,
        wherein the at least one occlusion area is separated from the non-occluded background component or a non-occluded non-foreground component by a foreground component or non-background component, and
        wherein the at least one occlusion area is inpainted along the inpainting direction indicated by the side information; and
    the decoder is further configured to reconstruct a texture-depth video coding block of a second texture frame and a second depth map associated with the second view based on the inpainted synthesized predicted texture-depth video coding block.

2. The decoding apparatus according to claim 1, wherein the inpainted candidate generator is further configured to generate the inpainted synthesized predicted texture-depth video coding block, by replication of non-occluded samples at the border of the occlusion area along the inpainting direction into the occlusion area of the synthesized predicted texture-depth video coding block.

3. The decoding apparatus according to claim 1, wherein the inpainting direction indicated by the side information comprises inpainting from left, right, up, down or arbitrary.

4. The decoding apparatus according to claim 1, wherein the side information comprises an index indicating the inpainting direction used for the inpainted synthesized predicted video coding block directly or indirectly.

5. An encoding apparatus for encoding a video coding block of a multi-view video signal, the apparatus comprising:
    an encoder configured to encode a texture-depth video coding block of a first texture frame and a first depth map associated with a first view for providing a decoded texture-depth video coding block of the first texture frame and the first depth map associated with the first view;
    a view synthesis predictor configured to generate a synthesized predicted texture-depth video coding block of a view synthesis texture frame and a view synthesis depth map associated with a second view based on the decoded texture-depth video coding block of the first texture frame and the first depth map associated with the first view,
        wherein the synthesized predicted texture-depth video coding block comprises at least one occlusion area separated from a non-occluded background component or a non-occluded non-foreground component by a foreground component or non-background component;
    an inpainted candidate generator configured to (i) generate a plurality of inpainted synthesized predicted texture-depth video coding blocks associated with the second view, (ii) separate each of the inpainted synthesized predicted texture-depth video coding blocks into one or more foreground components and/or one or more background components, and (iii) fill, based on an occlusion map, the at least one occlusion area by copying, along an inpainting direction, a sample of the non-occluded background component or the non-occluded non-foreground component positioned closest to the at least one occlusion area in an opposite direction to the inpainting direction,
        wherein the at least one occlusion area is inpainted along a different inpainting direction in each of the plurality of inpainted synthesized predicted texture-depth video coding blocks; and the encoder is further configured to encode side information in a bitstream, based on an inpainted synthesized predicted texture-depth video coding block selected from the plurality of inpainted synthesized predicted texture-depth video coding blocks,
wherein the side information indicates an inpainting direction used for the selected inpainted synthesized predicted texture-depth video coding block.

6. The encoding apparatus according to claim 5, wherein the inpainted candidate generator is further configured to:
generate the plurality of inpainted synthesized predicted texture-depth video coding blocks, by replication of non-occluded samples at the border of the occlusion area along two or more inpainting directions into the occlusion area of the synthesized predicted texture-depth video coding block.

7. The encoding apparatus according to claim 5, wherein the inpainting direction comprises inpainting from left, right, up, down or arbitrary.

8. The encoding apparatus according to claim 5, wherein the inpainted synthesized predicted texture-depth video coding block is selected from the plurality of inpainted synthesized predicted texture-depth video coding blocks based on a distortion cost function.

9. The encoding apparatus according to claim 5, wherein the side information comprises an index indicating an inpainting direction used for the selected inpainted synthesized predicted texture-depth video coding block directly or indirectly.

10. A method for decoding a video coding block of a multi-view video signal comprising side information, applied to a decoding apparatus, the method comprising:
decoding a texture-depth video coding block of a first texture frame and a first depth map associated with a first view for providing a decoded texture-depth video coding block of the first texture frame and the first depth map associated with the first view;
generating a synthesized predicted texture-depth video coding block of a view synthesis texture frame and a view synthesis depth map associated with a second view based on the decoded texture-depth video coding block of the first texture frame and the first depth map associated with the first view,
wherein the synthesized predicted texture-depth video coding block comprises at least one occlusion area separated from a non-occluded background component or a non-occluded non-foreground component by a foreground component or non-background component;
generating an inpainted synthesized predicted texture-depth video coding block associated with the second view;
separating the inpainted synthesized predicted texture-depth video coding block into one or more foreground components and/or one or more background components;
filling, based on an occlusion map, the at least one occlusion area by copying, along an inpainting direction, a sample of the non-occluded background component or the non-occluded non-foreground component positioned closest to the at least one occlusion area in an opposite direction to the inpainting direction,
wherein the at least one occlusion area is inpainted along the inpainting direction indicated by the side information; and
reconstructing a texture-depth video coding block of a second texture frame and a second depth map associated with the second view based on the inpainted synthesized predicted texture-depth video coding block.

11. The decoding method according to claim 10, wherein the inpainted synthesized predicted texture-depth video coding block is generated by replication of non-occluded samples at the border of the occlusion area into the occlusion area along the inpainting direction.

12. A method for encoding a video coding block of a multi-view video signal, applied to an encoder apparatus, the method comprising:
encoding a texture-depth video coding block of a first texture frame and a first depth map associated with a first view for providing a decoded texture-depth video coding block of the first texture frame and the first depth map associated with the first view;
generating a synthesized predicted texture-depth video coding block of a view synthesis texture frame and a view synthesis depth map associated with a second view based on the decoded texture-depth video coding block of the first texture frame and the first depth map associated with the first view,
wherein the synthesized predicted texture-depth video coding block comprises at least one occlusion area separated from a non-occluded background component or a non-occluded non-foreground component by a foreground component or non-background component;
generating a plurality of inpainted synthesized predicted texture-depth video coding blocks associated with the second view;
separating each of the inpainted synthesized predicted texture-depth video coding blocks into one or more foreground components and/or one or more background components;
filling, based on an occlusion map, the at least one occlusion area by copying, along an inpainting direction, a sample of the non-occluded background component or the non-occluded non-foreground component positioned closest to the at least one occlusion area in an opposite direction to the inpainting direction,
wherein the at least one occlusion area is inpainted along a different inpainting direction in each of the plurality of inpainted synthesized predicted texture-depth video coding blocks; and
encoding side information in a bitstream based on an inpainted synthesized predicted texture-depth video coding block selected from the plurality of inpainted synthesized predicted texture-depth video coding blocks,
wherein the side information indicates an inpainting direction used for the selected inpainted synthesized predicted texture-depth video coding block.

13. The encoding method according to claim 12, wherein the plurality of inpainted synthesized predicted texture-depth video coding blocks are generated by replication of non-occluded samples at the border of the occlusion area into the occlusion area along two or more inpainting directions.

14. The encoding method according to claim 12, wherein the inpainted synthesized predicted texture-depth video coding block is selected from the plurality of inpainted synthesized predicted texture-depth video coding blocks based on a distortion cost function.

15. The encoding method according to claim 12, wherein the side information comprises an index indicating an inpainting direction used for the selected inpainted synthesized predicted texture-depth video coding block directly or indirectly.

16. A non-transitory computer-readable medium carrying a program code which, when executed by a computer device, causes the computer device to perform a method for decoding a video coding block of a multi-view video signal comprising:
- decoding a texture-depth video coding block of a first texture frame and a first depth map associated with a first view for providing a decoded texture-depth video coding block of the first texture frame and the first depth map associated with the first view;
- generating a synthesized predicted texture-depth video coding block of a view synthesis texture frame and a view synthesis depth map associated with a second view based on the decoded texture-depth video coding block of the first texture frame and the first depth map associated with the first view,
  - wherein the synthesized predicted texture-depth video coding block comprises at least one occlusion area separated from a non-occluded background component or a non-occluded non-foreground component by a foreground component or non-background component;
- generating an inpainted synthesized predicted texture-depth video coding block associated with the second view;
- separating the inpainted synthesized predicted texture-depth video coding block into one or more foreground components and/or one or more background components;
- filling, based on an occlusion map, the at least one occlusion area by copying, along an inpainting direction, a sample of the non-occluded background component or the non-occluded non-foreground component positioned closest to the at least one occlusion area in an opposite direction to the inpainting direction,
  - wherein the at least one occlusion area is inpainted along the inpainting direction indicated by the side information; and
- reconstructing a texture-depth video coding block of a second texture frame and a second depth map associated with the second view based on the inpainted synthesized predicted texture-depth video coding block.

17. A non-transitory computer-readable medium carrying a program code which, when executed by a computer device, causes the computer device to perform a method for encoding a video coding block of a multi-view video signal comprising:
- encoding a texture-depth video coding block of a first texture frame and a first depth map associated with a first view for providing a decoded texture-depth video coding block of the first texture frame and the first depth map associated with the first view;
- generating a synthesized predicted texture-depth video coding block of a view synthesis texture frame and a view synthesis depth map associated with a second view based on the decoded texture-depth video coding block of the first texture frame and the first depth map associated with the first view,
  - wherein the synthesized predicted texture-depth video coding block comprises at least one occlusion area separated from a non-occluded background component or a non-occluded non-foreground component by a foreground component or non-background component;
- generating a plurality of inpainted synthesized predicted texture-depth video coding blocks associated with the second view;
- separating each of the inpainted synthesized predicted texture-depth video coding blocks into one or more foreground components and/or one or more background components;
- filling, based on an occlusion map, the at least one occlusion area by copying, along an inpainting direction, a sample of the non-occluded background component or the non-occluded non-foreground component positioned closest to the at least one occlusion area in an opposite direction to the inpainting direction,
  - wherein the at least one occlusion area is inpainted along a different inpainting direction in each of the plurality of inpainted synthesized predicted texture-depth video coding blocks; and
- encoding side information in a bitstream based on an inpainted synthesized predicted texture-depth video coding block selected from the plurality of inpainted synthesized predicted texture-depth video coding blocks,
  - wherein the side information indicates an inpainting direction used for the selected inpainted synthesized predicted texture-depth video coding block.

* * * * *

UNITED STATES PATENT AND TRADEMARK OFFICE
CERTIFICATE OF CORRECTION

PATENT NO. : 11,343,488 B2
APPLICATION NO. : 16/729086
DATED : May 24, 2022
INVENTOR(S) : Zhao et al.

It is certified that error appears in the above-identified patent and that said Letters Patent is hereby corrected as shown below:

On the Title Page

Item (56) Other Publications, Column 2, Line 1: "Cao et al., "Encoder-Driven Inpainting Strategy in Multiview Video" should read -- Gao et al., "Encoder-Driven Inpainting Strategy in Multiview Video --.

Signed and Sealed this
Eleventh Day of October, 2022

Katherine Kelly Vidal
*Director of the United States Patent and Trademark Office*